(12) United States Patent
Zheng et al.

(10) Patent No.: US 11,847,488 B2
(45) Date of Patent: *Dec. 19, 2023

(54) GRAPH DATA PROCESSING METHOD, METHOD AND DEVICE FOR PUBLISHING GRAPH DATA COMPUTATIONAL TASKS, STORAGE MEDIUM, AND COMPUTER APPARATUS

(71) Applicant: Tencent Technology (Shenzhen) Company Limited, Shenzhen (CN)

(72) Inventors: Bo Zheng, Shenzhen (CN); Rijia Liu, Shenzhen (CN); Zhibin Liu, Shenzhen (CN); Qian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 807 days.

This patent is subject to a terminal disclaimer.

(21) Appl. No.: 16/983,948

(22) Filed: Aug. 3, 2020

(65) Prior Publication Data
US 2020/0364084 A1 Nov. 19, 2020

Related U.S. Application Data

(63) Continuation of application No. PCT/CN2019/082192, filed on Apr. 11, 2019.

(30) Foreign Application Priority Data

May 16, 2018 (CN) .......................... 201810467817.8

(51) Int. Cl.
*G06F 9/48* (2006.01)
*G06F 9/50* (2006.01)
(Continued)

(52) U.S. Cl.
CPC ............ *G06F 9/4881* (2013.01); *G06F 9/505* (2013.01); *G06F 9/5072* (2013.01); *H04L 9/0643* (2013.01); *H04L 9/50* (2022.05)

(58) Field of Classification Search
CPC ...... G06F 9/4881; G06F 9/505; G06F 9/5072; H04L 9/0643; H04L 9/50; H04L 63/12
(Continued)

(56) References Cited

U.S. PATENT DOCUMENTS

| 2017/0039330 | A1 | 2/2017 | Tanner, Jr. et al. |
| 2017/0364701 | A1* | 12/2017 | Struttmann ............. G06F 21/78 |
| 2018/0129953 | A1 | 5/2018 | Saxena et al. |

FOREIGN PATENT DOCUMENTS

| CN | 105590321 A | 5/2016 |
| CN | 106033476 A | 10/2016 |

(Continued)

OTHER PUBLICATIONS

Reiki Kanda et al., "An Experiment on Estimation of Block Propagation Latency on the Bitcoin Network", Tokyo Institute of Technology, The Institute of Electronics, Information and Communication Engineers (IEICE), 2018, 8 pgs.
(Continued)

*Primary Examiner* — Kambiz Zand
*Assistant Examiner* — Aubrey H Wyszynski
(74) *Attorney, Agent, or Firm* — Morgan, Lewis & Bockius LLP

(57) ABSTRACT

This application relates to a graph data processing method performed by a distributed computer node cluster including a plurality of computer devices, each computer device distributed on a respective computing node of the distributed computer node cluster, the method including: obtaining subgraph data divided from to-be-processed graph data; performing a computation task on the subgraph data to
(Continued)

obtain corresponding global data and local data; writing the global data to a blockchain network, the global data of the blockchain network being updated by the distributed computing node cluster; obtaining latest global data from the blockchain network; and iteratively performing, according to the obtained latest global data and the local data, the computation task on the subgraph data without obtaining a computation result until an iteration stopping condition is met.

20 Claims, 13 Drawing Sheets

(51) Int. Cl.
*H04L 9/06* (2006.01)
*H04L 9/00* (2022.01)

(58) Field of Classification Search
CPC ..... H04L 67/104; H04L 67/10; H04L 9/3239; H04L 63/0442; H04L 67/1008; H04L 67/1095
USPC ......................................................... 713/157
See application file for complete search history.

(56) References Cited

FOREIGN PATENT DOCUMENTS

| | | |
|---|---|---|
| CN | 106357405 A | 1/2017 |
| CN | 106611061 A | 5/2017 |
| CN | 106777351 A | 5/2017 |
| CN | 107864198 A | 3/2018 |
| CN | 108683738 A | 10/2018 |
| JP | 2016218633 A | 12/2016 |
| WO | WO-2018170253 A1 * | 9/2018 ........... G06F 9/5072 |

OTHER PUBLICATIONS

Cha Kyu-il et al., "Exascale or Intelligent Orchestration Storage Platform", Korea Institute of Electronics and Communications, Jung Journal of Complementary Sciences 34(7), Jul. 31, 2016, 12 pgs.

Tencent Technology, ISR, PCT/CN2019/082192, Jul. 10, 2019, 2 pgs.

Tian et al., "From 'Think Like a Vertex' to 'Think Like a Graph'", Dec. 31, 2013, 12 pgs.

Yuan et al., "Research of Large-Scale Graph Data Management with In-Memory Computing Techniques", Journal of East China Normal University (Natural Science), Sep. 2014, pp. 55-71.

Extended European Search Report, EP 19804270.7, dated Apr. 21, 2021, 12 pgs.

Tencent Technology, WO, PCT/CN2019/082192, Jul. 10, 2019, 5 pgs.

Tencent Technology, IPRP, PCT/CN2019/082192, Nov. 17, 2020, 6 pgs.

Tencent Technology, EP Office Action, European Patent Application No. 19804270.7, dated Dec. 7, 2022, 5 pgs.

* cited by examiner

GRAPH DATA PROCESSING METHOD, METHOD AND DEVICE FOR PUBLISHING GRAPH DATA COMPUTATIONAL TASKS, STORAGE MEDIUM, AND COMPUTER APPARATUS

CROSS REFERENCE TO RELATED APPLICATIONS

This application is a continuation application of PCT Patent Application No. PCT/CN2019/082192, entitled "GRAPH DATA PROCESSING METHOD, METHOD AND DEVICE FOR PUBLISHING GRAPH DATA COMPUTATIONAL TASKS, STORAGE MEDIUM, AND COMPUTER APPARATUS" filed on Apr. 11, 2019, which claims priority to Chinese Patent Application No. 201810467817.8, entitled "GRAPH DATA PROCESSING METHOD AND METHOD FOR PUBLISHING A GRAPH DATA COMPUTATION TASK", filed with the Chinese Patent Office on May 16, 2018, all of which are incorporated herein by reference in their entirety.

FIELD OF THE TECHNOLOGY

This application relates to the field of graph computer technologies, and in particular, to a graph data processing method and apparatus, a method and apparatus for publishing a graph data computation task, a storage medium, and a computer device.

BACKGROUND OF THE DISCLOSURE

With the development of computer technologies, there is an abstract expression of the real world by using a graph structure based on a "graph theory", and a computing mode based on this data structure, that is, graph computing.

The graph computing is the abstract expression of the real world by using the "graph" structure based on the "graph theory", and is the computing mode based on this data structure. The graph data structure well expresses an association between data. Therefore, problems occurring in many applications may be abstractly expressed as a graph, and the problems can be resolved by establishing a model using an idea of the graph theory or based on a graph. For example, the graph data may be used for representing information such as a social network, a commodity purchase relationship, a road traffic network, and a communications network, and there are an increasing quantity of increasingly complex computing requirements based on the graph data.

SUMMARY

Embodiments of this application provide a graph data processing method, a method and apparatus for publishing a graph data computation task, a computer-readable storage medium, and a computer device.

An embodiment of this application provides a graph data processing method, performed by a distributed computer node cluster including a plurality of computer devices, each computer device having a processor and memory storing a plurality of computer programs to be executed by the processor, the method including:
obtaining subgraph data divided from to-be-processed graph data;
performing a computation task on the subgraph data to obtain corresponding global data and local data;
writing the global data to a blockchain network, the global data in the blockchain network being updated by the distributed computing node cluster;
obtaining latest global data from the blockchain network; and
iteratively performing, according to the obtained latest global data and the local data, the computation task on the subgraph data without obtaining a computation result until an iteration stopping condition is met.

An embodiment of this application further provides a non-transitory computer-readable storage medium, storing a plurality of computer programs, the computer programs, when executed by a distributed computer node cluster including a plurality of computer devices, causing the distributed computer node cluster to perform operations of the aforementioned graph data processing method.

An embodiment of this application further provides a distributed computer node cluster including a plurality of computer devices, each computer device having a processor, memory and a plurality of computer programs stored in the memory that, when executed by the processors, cause the distributed computer node cluster to perform operations of the aforementioned graph data processing method.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

In some embodiments, a graph computation method may be a graph computation method based on a centralization idea. A parameter server is often used for storing and updating data that needs to be shared in a graph computation process. Although the parameter server may distributively store the data that needs to be shared on server nodes, to avoid a single point of failure to some extent, during a data update, it is needed to rely on a centralized driver to coordinate processing. This often results in huge network throughput in the graph computation process, and consequently, network communication becomes a bottleneck of a graph computing system. In particular, when hyper-scale data is processed, a data update delays, resulting in existence of an inefficient computation problem in a conventional graph computation method based on centralization.

Based on this, it is necessary to provide a graph data processing method, a method and apparatus for publishing a graph data computation task, a computer-readable storage medium, and a computer device, to resolve the technical problem of inefficient graph data computation.

Figure 1:
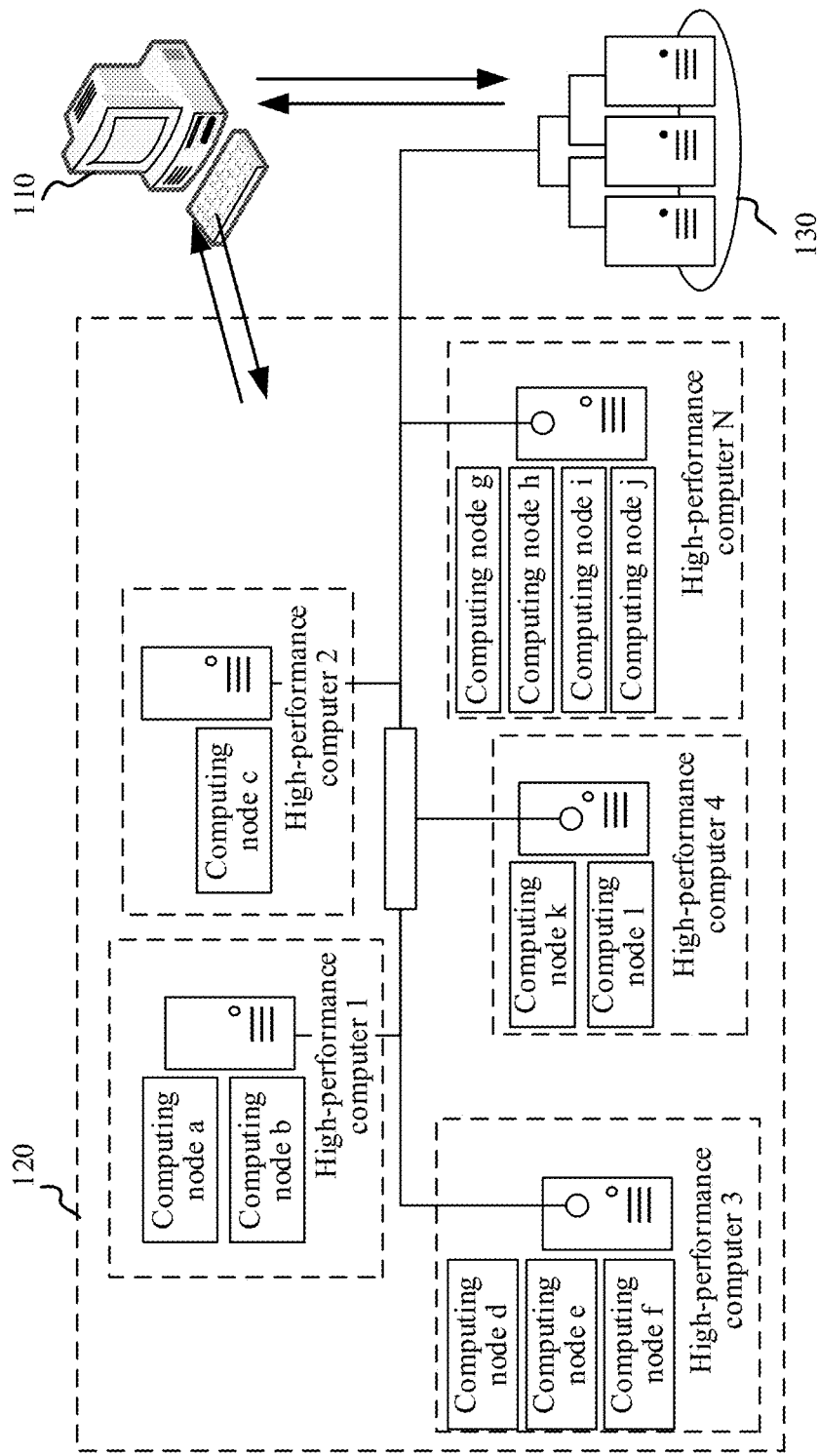
FIG. 1 is a diagram of an application environment of a graph data processing method in some embodiments.

FIG. 1 is a diagram of an application environment of a graph data processing method in some embodiments. Referring to FIG. 1, the graph data processing method is applied to a distributed graph computing system. The distributed graph computing system includes a control node 110, a computing node 120, and a data warehouse 130. The control node 110 and the computing node 120 are connected through a blockchain network, and the control node 110 and the computing node 120 are separately connected to the data warehouse 130 through a network. The control node 110 may be implemented by using a terminal. The terminal may be specifically a desktop terminal or a mobile terminal, and the mobile terminal is, for example, a mobile phone, a tablet computer, a notebook computer, or the like. The computing node 120 may be implemented by using a program deployed on one or more servers. For example, computing nodes a, b, c, and the like shown in FIG. 1 are distributed on a high performance computer 1 to a high performance computer N respectively. The data warehouse 130 may be a centralized storage device, or may be a distributed storage cluster or device. In some embodiments, the distributed graph computing system includes a distributed computing node cluster. The graph data processing method may be applied to computing nodes in the distributed computing node cluster.

Figure 2:
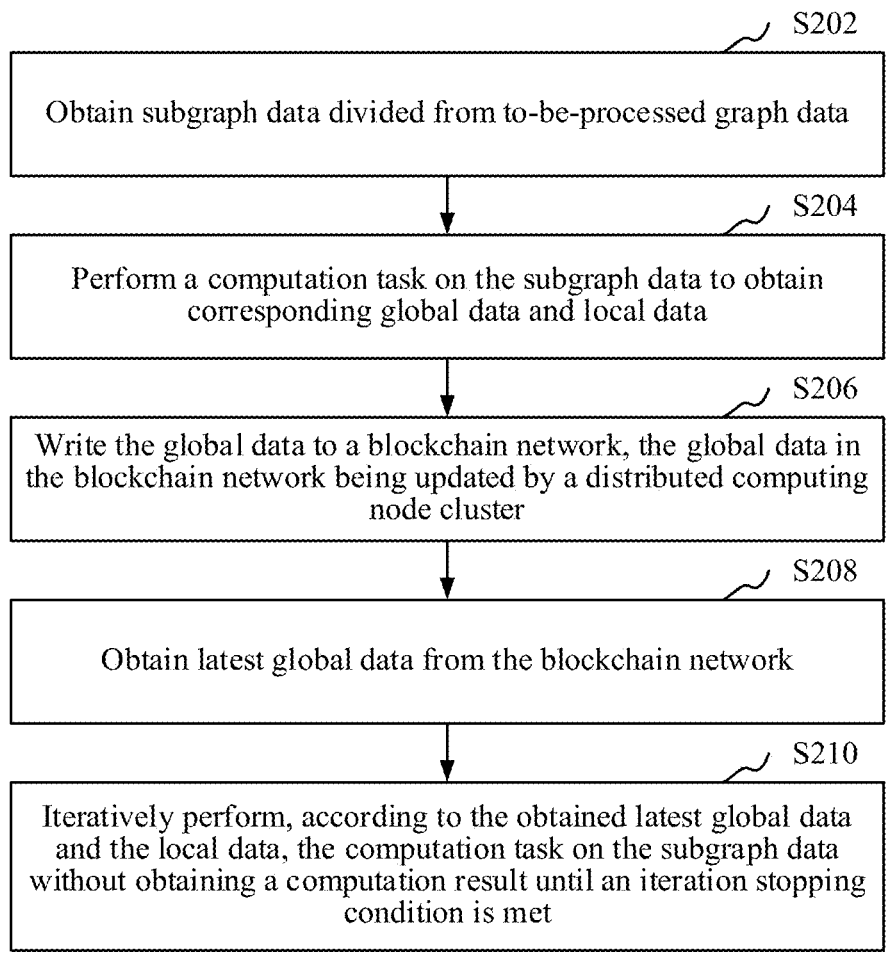
FIG. 2 is a schematic flowchart of a graph data processing method in some embodiments.
Figure 3:
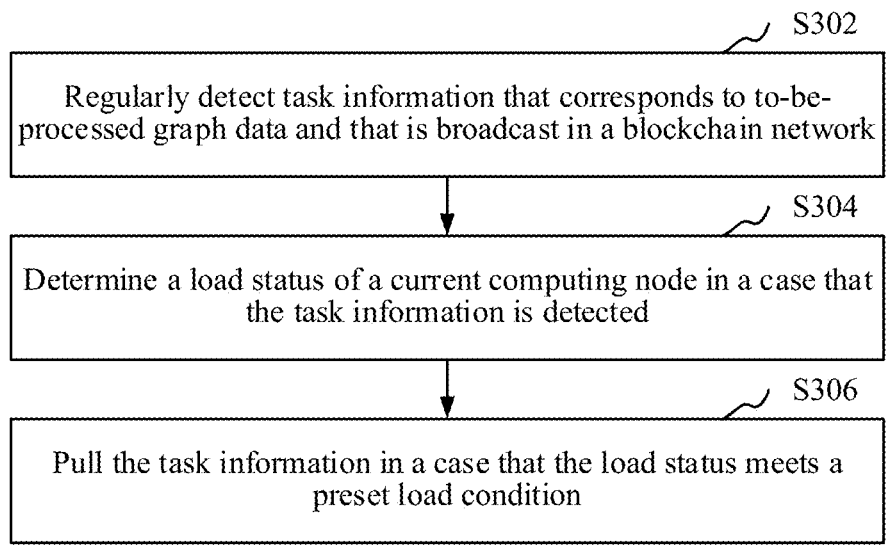
FIG. 3 is a schematic flowchart of an operation of obtaining task information that corresponds to to-be-processed graph data and that is broadcast in a blockchain network in some embodiments.
Figure 4:
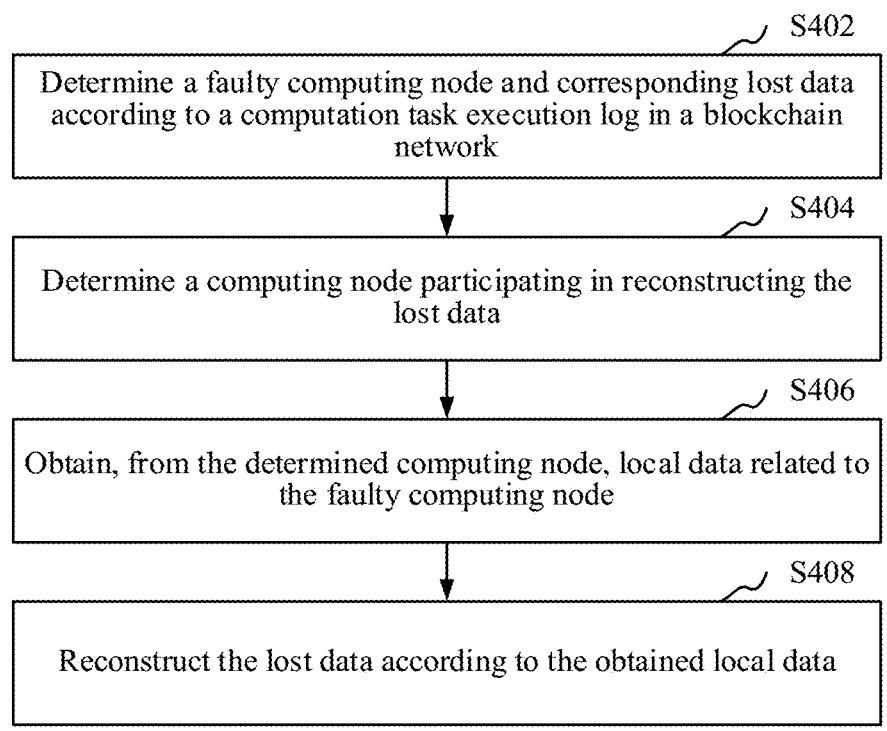
FIG. 4 is a schematic flowchart of an operation of reconstructing lost data in some embodiments.
Figure 5:
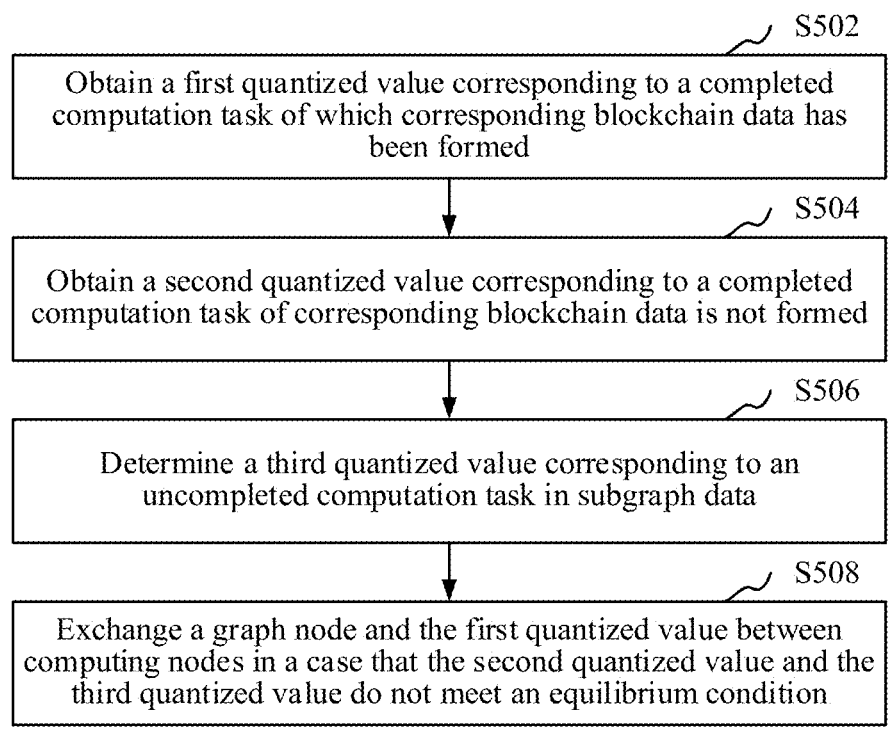
FIG. 5 is a schematic flowchart of an operation of exchanging graph nodes in some embodiments.

As shown in FIG. 2, in some embodiments, a graph data processing method is provided. In this embodiment, description is made mainly by using an example in which the method is applied to the computing nodes in the distributed computing node cluster in FIG. 1. Referring to FIG. 2, the graph data processing method specifically includes the following steps:

S202. Obtain subgraph data divided from to-be-processed graph data.

The graph data is structured data organized using a graph structure, and relationship information between entities is stored by applying a graph theory. Mathematically, the graph structure may be represented by a 2-tuple $G=<V, E>$, where $V=\{v_i\}_{i=1}^{N}$ represents a set of N graph nodes in the graph data, and $E=\{e_{ij}\}=\{(v_i, v_j)_m\}_{m=1}^{M}$ represents connecting edges between the graph nodes. The to-be-processed graph data is graph data to be processed by the computing nodes. The subgraph data is partial graph data divided from the to-be-processed graph data.

Generally, the graph data is formed by edges between the graph nodes. The graph node is a vertex in graph data, and may be used for representing a subject in the graph data. For example, when the graph data is used for storing information between individuals in a social network, different graph nodes in the graph data may be used for representing different individuals. Alternatively, when the graph data is used for representing a commodity purchase relationship, each user is a graph node, and each commodity is a graph node. The graph node may include information such as a node identifier and a node attribute of the graph node. The edges between the graph nodes are edges in the graph data, and may be used for representing a relationship between different subjects in the graph data. For example, when the graph data is used for storing the information between individuals in the social network, different graph nodes in the graph data may be used for representing different individuals, and the relationship between individuals, for example, friendship, may be represented by the edges in the graph data. When the graph data is used for representing a commodity purchase relationship, each user is a graph node, each commodity is a graph node, the user purchasing the commodity is presented as an edge, and so on.

In some embodiments, the computing nodes may be a program deployed on one or more servers, and the computing nodes may form a virtual network structure through a medium, namely, a blockchain. The computing node may write information such as data, a computation task execution log, or a computing node status to a new block, and add the new block to the blockchain network, thereby facilitating communication coordination between computing nodes, to complete a computation task corresponding to the subgraph data, and further complete a computation task corresponding to the to-be-processed graph data. The computing node status is status information of the computing node, including a central processing unit (CPU) memory resource consumed by performing the computation task by a current computing node, a name and a type of an algorithm, a quantity of error, and the like.

In some embodiments, the distributed graph computing system includes a control node. The control node may access the blockchain network through communicating with one or more computing nodes in the distributed graph computing system. The control node may broadcast the task information in the blockchain network by recording task information corresponding to the to-be-processed graph data in the new block and adding the new block to the blockchain network. In this way, all computing nodes in the blockchain network can receive the broadcast task information. The task information is information related to the computation task.

In some embodiments, the computing node may regularly check, by using a timer, a timing program, or the like, information recorded in a latest block in the blockchain network. When the task information is detected, a load status of the computing node is determined by itself. When the computing node is not overloaded, the computing node may load the task information from the blockchain network.

In some embodiments, the task information may include an obtaining path of a task-executable file, an algorithm parameter for performing the computation task, an obtaining path of the subgraph data, an output path of a computation result, an expected completion time, and the like. After loading the task information from the blockchain network, the computing node may obtain subgraph structures in the graph structure corresponding to the to-be-processed graph data, and obtain corresponding subgraph data from a data warehouse according to the obtained subgraph structures.

In some embodiments, when loading the task information from the blockchain network, the computing node may randomly obtain, according to the load status of itself, a specific quantity of graph nodes and corresponding edges from the graph structure corresponding to the to-be-processed graph data, to form the subgraph structures, and obtain, according to the obtaining path of the subgraph data recorded in the task information, the subgraph data corresponding to the subgraph structures from the data warehouse.

In some embodiments, the distributed graph computing system may divide the to-be-processed graph data according to a current quantity of computing nodes, or the to-be-processed graph data according to a preset condition, for example, averagely or randomly into a corresponding quantity of pieces of subgraph data.

S204. Perform a computation task on the subgraph data to obtain corresponding global data and local data.

The computation task is workload that needs to be computed during processing on the to-be-processed graph data. The global data is data that needs to be globally shared and globally updated in a process in which the computing nodes compute the subgraph data, and a scale of the global data is limited. The local data is data that is used and updated only by a few computing nodes in the process in which the computing nodes compute the subgraph data.

Specifically, after obtaining the subgraph data divided from the to-be-processed graph data, the computing node may perform corresponding computation on the graph nodes and the edges in the obtained subgraph data, to obtain the corresponding global data and local data.

In some embodiments, each graph node in the subgraph data may correspond to one unit computation task. In this embodiment, the unit computation task is a minimum computation allocation unit in the distributed graph computing system, for example, a computation task corresponding to a specific graph node in a current iterative computation process.

In some embodiments, after loading the task information, the computing node pulls, according to information such as the obtaining path of the task-executable file recorded in the task information, the algorithm parameter for performing the computation task, and the like, a corresponding task-executable file and an algorithm parameter for performing the computation task from the data warehouse. Further, after obtaining the subgraph data, the computing node executes the pulled task-executable file according to the algorithm parameter for performing the computation task, to perform the computation task on the subgraph data.

In some embodiments, the computing node may assign initial values to the global data and the local data randomly or according to historical experience. The computing node executes the task-executable file according to the algorithm parameter for performing the computation task, and the initial values of the global data and the local data, and updates the global data and the local data.

In some embodiments, the computation performed on the to-be-processed graph data is an iterative computation. As the algorithm is iteratively updated, a new computation task is generated in each iteration process. Each graph node in the subgraph data may be driven by the algorithm to continuously generate a unit computation task for which the computation needs to be completed.

In some embodiments, the computing node performs the computation task on the subgraph data, and after obtaining the corresponding global data and the local data, may store the corresponding data in isolation according to different tasks and different graph nodes.

S206. Write the global data to a blockchain network, the global data in the blockchain network being updated by a distributed computing node cluster.

The blockchain network is a carrier and an organization mode for running a blockchain technology. The blockchain technology (BT for short), also referred to as a distributed ledger technology, is an Internet database technology, and features decentralization, openness, and transparency, so that everyone may participate in database recording. The blockchain technology is a brand new distributed-infrastructure and computing-paradigm that verifies and stores data by using a blockchain data structure, generates and updates data by using a distributed node consensus algorithm to, ensures security of data transmission and data access in a cryptographic manner, and performs programming and operates data by using smart contracts including automation scripts. The distributed computing node cluster is a set including distributed computing nodes.

Specifically, after performing the computation task on the subgraph data to obtain the corresponding global data and local data, the computing node may share the obtained global data among the distributed computing nodes through the blockchain network. The computing node may write the global data to a new block, and write, after the new block is verified by the blockchain network, the global data to the blockchain network in a manner in which the new block is attached to a tail end of the blockchain network.

In some embodiments, the computing nodes in the distributed graph computing system may asynchronously perform the computation tasks on the subgraph data, to obtain corresponding global data and local data respectively. The computing nodes asynchronously perform the computation tasks, and may write the global data to the blockchain network according to their own conditions after the corresponding computation tasks are completed. The global data in the blockchain network is updated jointly by the distributed computing node cluster.

In some embodiments, the computing node may perform hash encryption on the global data, to obtain a corresponding character string, encrypt the character string by using a preset private key to generate a signature, and then write the global data and the signature to the blockchain network. After obtaining the global data and the signature, other nodes may obtain a corresponding public key from the data warehouse to perform verification on validity of the signature, and then obtain the corresponding global data and buffer and update the corresponding global data to local global data after the verification succeeds.

In some embodiments, the foregoing blockchain network may include a private blockchain, and a key required for recording the data in the blockchain network may be generated in advance according to a relevant asymmetric encryption algorithm standard such as an elliptic curve encryption algorithm or a Rivest-Shamir-Adleman (RSA) encryption algorithm (an asymmetric encryption algorithm), and be stored in the data warehouse. The computing node may access the data warehouse to obtain a relevant key when use of the key is needed.

In some embodiments, the computing node may alternatively record all relevant data from a previous block to a current time, for example, current global data, a computation task execution log, or a computing node status, in the new block and add the new block to the blockchain network.

In some embodiments, the computing node may actively broadcast the relevant data recorded in the new block, to share the broadcast relevant data, for example, the global data recorded in the new block, with all computing nodes in the distributed graph computing system. Alternatively, the relevant data recorded in the new block may be spread in a form of a request. Spreading in the form of the request means that the computing node may obtain the relevant data recorded in the new block by transmitting the request.

In a specific application scenario, in a graph computing problem related to the to-be-processed graph data, the graph structure corresponding to the to-be-processed graph data is usually a relatively sparse graph, and a quantity M of edges in the to-be-processed graph data is far less than a combination of two quantities N of nodes of the graph: $M \ll A\_n^2$. In this way, the global data that needs to be shared globally is usually limited in scale. Most of the data has specific locality, and is only used by a few computing nodes. By using the distributed graph computing system, the global data is shared globally through the blockchain network. The local data may be buffered to the corresponding computing nodes, and may be obtained in the form of the request, thereby avoiding a large amount of unnecessary network communication overhead.

S208. Obtain latest global data from the blockchain network.

Specifically, the computing node may obtain, through the blockchain network, the latest global computation data recorded in the new block. In some embodiments, the computing node may buffer the latest global computation data from the blockchain network in a manner of regularly checking the new block.

In some embodiments, when the new block is broadcast in the blockchain network, the computing node may obtain the global data from the new block. The computing node locally buffers the obtained global data. The computing node may be driven by a timer to replace and update oldest global data, and an update policy thereof is similar to common first in first out (FIFO) and least frequently used (LFU) page-replacement algorithm policies. Details are not described herein.

In some embodiments, the computing node may regularly detect a quantity of blocks in the blockchain network, obtain, in a case that the quantity of blocks is increased, the global data recorded in the new block, and update the local global data according to the obtained global data.

In some embodiments, the computing node may regularly detect block data in the blockchain network through a timer or by running a preset timing and detection program. The computing node may obtain, in a case that the quantity of blocks is increased, the global data recorded in the new block in the form of the request, and update the local global data according to the obtained global data. In this way, the global data can be quickly and conveniently updated, thereby improving execution efficiency of subsequent processing on the subgraph data.

In some embodiments, the computing node may generate a computation task of a new iterative computation according to the global data and the local data. When generating the computation task of the new iterative computation, the computing node obtains the latest global data from the blockchain network in the form of a data request, obtains required local data from adjacent computing nodes, and generates a computation task of a new iterative computation according to the obtained latest global data, the local data at the adjacent computing nodes, and local data.

S210. Iteratively perform, according to the obtained latest global data and the local data, the computation task on the subgraph data without obtaining a computation result until an iteration stopping condition is met.

The iteration stopping condition is a condition of ending the iterative computation. The iteration stopping condition may be that a preset quantity of iterations is reached, iterative computation reaches a preset duration, a computation result obtained through the iterative computation converges to a stable value, or the like.

Specifically, the computing node may iteratively perform, according to the obtained latest global data and the local data, the computation task on the subgraph data. If the iteration stopping condition is not met after the computation task on the subgraph data is performed, step S204 is performed again to continue the computation, and the computation is not ended until the iteration stopping condition is met.

In some embodiments, the graph node in the subgraph data may be driven by the algorithm to continuously generate the computation task for which the computation needs to be completed. The computing node may determine a to-be-processed computation task in the subgraph data according to the subgraph data, a quantity and content of completed computation tasks, and the latest global data and the local data. For example, the computing node may generate, according to the subgraph data, completed computation tasks at first s time points on which a computation task of a current iterative computation depends, and 0corresponding latest global data and current local data, and may be driven by an algorithm to generate a computation task of a next iterative computation. The computing node performs the generated computation task, and updates the global data and the local data. Such an iteration is repeated without obtaining a computation result until an iteration stopping condition is met.

Description is made by using an example in which the graph data processing method is applied to model training. The graph data may be inputted to a machine learning model, to determine an intermediate prediction result corresponding to the graph nodes in the graph data, model parameters of the machine learning model are adjusted according to a difference between the intermediate prediction result and a label that corresponds to the graph data, and the training is continued and is not ended until the iteration stopping condition is met. In each model training process, model parameters obtained through training may include the global data and the local data. Model parameters obtained through previous model training are used in a current model training process, model parameters obtained through current model training are used for next model training, and so on.

In some embodiments, in a graph computing problem, requirements for data consistency vary greatly according to different algorithms. In this embodiment, because information transfer in the blockchain network is flooded, the global data obtained by the computing node usually has a specific data delay, and strong consistency cannot be ensured. That is, an error of a global parameter falls within a controllable range, and a stochastic gradient descent algorithm or the like is insensitive to the error. However, correspondingly, because the local data is stored locally, or is communicated or shared through a point-to-point direct connection, consistency of the local data can be well ensured, and no data delay exists.

In some embodiments, after iteratively performing, according to the obtained latest global data and the local data, the computation task on the subgraph data, the computing node may obtain, in a case that the iteration stopping condition is met, the computation result corresponding to the subgraph data. The computing nodes may store the local data of the subgraphs, and the computation results to the data warehouse. The data warehouse may perform consistent integration on the global data in the blockchain network, the local data of the subgraphs, and the computation results corresponding to the subgraphs.

In the foregoing graph data processing method, the to-be-processed graph data is divided into the subgraph data for distributed processing, so that efficiency of processing the graph data can be greatly improved. The global data that needs to be shared globally and that is obtained by the computing nodes in the distributed computing process of the graph data is then written to the blockchain network, and is globally shared through the blockchain network, so that communication traffic consumed by data sharing is greatly reduced. In addition, in a process of performing an iterative computation on the to-be-processed graph data, the latest global data and the local data locally buffered may be quickly and directly obtained from the blockchain network without using a centralized driver to coordinate and update the data, so that efficiency of processing the graph data is greatly improved.

In some embodiments, step S202 specifically includes: obtaining task information that corresponds to the to-be-processed graph data and that is broadcast in the blockchain network; and reading, according to the task information, a corresponding task-executable file and the subgraph data that is divided from the to-be-processed graph data. Step S204 specifically includes: performing the task-executable file, to perform the computation task on the subgraph data to obtain the corresponding global data and the local data.

Specifically, the computing node may obtain, through the blockchain network, the task information that corresponds to the to-be-processed graph data and that is broadcast in the blockchain network, read, according to the task information from the local or the data warehouse, the corresponding task-executable file and the subgraph data divided from the to-be-processed graph data, and perform the task-executable file, to perform the computation task on the subgraph data.

In some embodiments, the distributed graph computing system includes a control node. The control node may record task information corresponding to the to-be-processed graph data in the new block, add the new block to the blockchain network, and broadcast the task information in the blockchain network.

In some embodiments, all computing nodes in the blockchain network may receive, through broadcasting of the new block, the task information corresponding to the to-be-processed graph data.

In some embodiments, the computing node may regularly check, by using a timer, a timing program, or the like, information recorded in a latest block in the blockchain network, and actively obtain the task information that corresponds to the to-be-processed graph data and that is broadcast in the blockchain network.

In some embodiments, steps of performing the computation task may be performed by obtaining the task information that corresponds to the to-be-processed graph data and that is broadcast in the blockchain network, then reading, according to the task information, the corresponding task-executable file and the corresponding subgraph data, and performing the task-executable file. The task information may be a light file. In this way, publishing a task through the blockchain network can greatly reduce communication traffic of publishing and obtaining the task in the distributed graph computing system, thereby greatly improving efficiency of the task publishing.

In some embodiments, the step of obtaining task information that corresponds to to-be-processed graph data and that is broadcast in a blockchain network specifically includes the following steps:

S302. Regularly detect the task information that corresponds to the to-be-processed graph data and that is broadcast in the blockchain network.

Specifically, the computing node may regularly detect, by using a timer, a timing program, or the like, the task information that corresponds to the to-be-processed graph data and that is broadcast in the blockchain network. In some embodiments, the control node may broadcast the task information through the blockchain network by recording the task information in the new block.

S304. Determine a load status of a current computing node in a case that the task information is detected.

Specifically, after detecting new task information, the computing node may determine the load status of the current computing node.

S306. Pull the task information in a case that the load status meets a preset load condition.

The preset load condition is a preset condition, for example, a load is less than a preset threshold or a load falls within a preset range. The computing node may determine whether the current load status meets the preset load condition. In a case that the load status of the computing node meets the preset load condition, for example, in a case that the computing node is in an idle state, the computing node may pull the task information. In a case that the load status of the computing node does not meet the preset load condition, for example, in a case that the computing node is in an overload state, the computing node may omit the task information.

In the foregoing embodiment, latest task information may be obtained in real time by regularly detecting the task information that corresponds to the to-be-processed graph data and that is broadcast in the blockchain network. The task information is pulled only in a case that the load status of the computing node meets the preset load condition, so that it can be ensured that the computing node that pulls the task information has an idle resource to process the corresponding computation task, thereby avoiding invalid pulling, and further improving efficiency of processing the graph data.

In some embodiments, step S206 specifically includes the following steps: creating a new block; writing the global data to the created new block; and adding, after the new block is verified by a blockchain network, the new block to the blockchain network.

Specifically, the computing node may regularly create the new block, and write global computation data obtained after performing the computation task on the subgraph data to the created new block. After the new block is verified by the blockchain network, the new block is added to the blockchain network.

In some embodiments, the computing node may generate a new block according to a corresponding consensus algorithm. The consensus algorithm is, for example, a consensus hash algorithm. The computing node may write global data corresponding to the completed computation task to the new block. In some embodiments, the computing node may write information such as the global data, the computation task execution log, exchanged data of the graph node, or the computing node status to the new block.

In some embodiments, when a blockchain is a private chain, a quantity of bits of the consensus hash algorithm may be reduced, to improve processing efficiency, and improve system throughput. The quantity of bits of the consensus hash algorithm is reduced. For example, a 128-bit secure hash algorithm (SHA) instead of 256-bit SHA is used. Alternatively, the consensus hash algorithm may be adjusted to be a proof of work (POS), and a coin age is used for determining a generator of a next new block.

In some embodiments, for a consensus hash function, a quantity of consensus prefixes 0 may alternatively be limited for controlling complexity, which is similar to controlling of the quantity of bits. A larger quantity of the prefixes 0 limiting a hash result indicates that greater difficulty in resolving a consensus problem.

In some embodiments, the blockchain network may use a corresponding consensus algorithm to perform verification on the new block. After the new block is verified by the blockchain network, the computing node may add the new block to the blockchain network.

In some embodiments, in the distributed graph computing system, a plurality of new blocks may be generated simultaneously, resulting in branching of the blockchain network. A policy of handling the branching uses a common majority identification principle, so that only one branch finally becomes a main chain. If the new block created by the current computing node does not become the main chain, the computing node status returns to a status before the new block is generated. To avoid loss of the data recorded in the new block, the computing nodes may buffer the corresponding data locally for a period of time.

In the foregoing example, the global data is written to a new block, and after the new block is verified by the blockchain network, the global data may be shared in the blockchain network, thereby greatly reducing communication traffic required for sharing the global data.

In some embodiments, the step of writing the global data to the created new block includes: writing the global data and a corresponding computation task execution log to the new block. The graph data processing method further includes the step of reconstructing lost data. The step specifically includes the following steps.

S402. Determine a faulty computing node and corresponding lost data according to the computation task execution log in the blockchain network.

The computation task execution log is log data generated when the computation task is performed. In some embodiments, when failing to obtain local data from adjacent nodes, the computing node may pull and organize a corresponding computation task execution log from the blockchain network according to requirements to determine a faulty computing node and corresponding lost data.

S404. Determine a computing node participating in reconstructing the lost data.

Specifically, the computing node participating in reconstructing the lost data is an adjacent computing node of the faulty node. In some embodiments, when the faulty computing node is determined, the adjacent computing node of the faulty computing node may obtain parts of a subgraph data structure of the faulty computing node according to its own load status, and obtain, from the data warehouse according to the obtained parts of the subgraph data structure, corresponding parts of subgraph data and combine the parts of subgraph data to form new subgraph data.

S406. Obtain, from the determined computing node, local data related to the faulty computing node.

Specifically, the computing node may obtain, from another computing node participating in reconstructing the lost data, local data related to the faulty computing node. In some embodiments, the computing node may alternatively search the local data buffered locally for the local data related to the faulty computing node, and share the found local data with a computing node participating in reconstructing the lost data, the shared local data being used for reconstructing the lost data by the another computing node. A sharing mode may be that the computing node actively transmits local data related to the faulty computing node to a corresponding computing node, or may be that the computing node that needs the data initiates a data obtaining request, to obtain the corresponding local data.

In some embodiments, the computing node participating in reconstructing the lost data may alternatively be an unloaded computing node. In this case, the computing node participating in reconstructing the lost data may obtain the local data that is related to the faulty computing node and that is shared by the computing node adjacent to the faulty computing node, and reconstruct the lost data according to the shared local data.

S408. Reconstruct the lost data according to the obtained local data.

Specifically, the computing node may reconstruct the lost data according to a minimum error principle. The computing node may reconstruct the lost data according to the obtained local data by using an interpolation method. A commonly used interpolation method is, for example, a sliding average window method, a regression method, or an interpolation function method. Alternatively, a mean value, a median, or a mode of the obtained local data is used as a reconstruction value of the lost data.

In the foregoing embodiment, the faulty node and the corresponding lost data may be quickly located by using the computation task execution log recorded in the blockchain network. The lost data may be quickly reconstructed according to the local data shared by the computing node participating in reconstructing the lost data, to prevent a single point of failure of the computing node from affecting an overall computation, so that the entire distributed graph processing system has relatively high reliability.

In some embodiments, the graph data processing method further includes the step of exchanging graph nodes. The step specifically includes the following steps.

S502. Obtain a first quantized value corresponding to a completed computation task of which corresponding blockchain data has been formed.

The blockchain data is data recorded in the blockchain network, and the new block in the blockchain network may share the recorded information in a broadcast manner. The quantized value is a value obtained by quantizing the computation task. For example, one unit of computation task corresponds to one unit of quantized value. The first quantized value is a value obtained by quantizing the completed computation task of which the corresponding blockchain data has been formed in the computing node. The first quantized value may measure a computing capacity of the computing node, and corresponds to some completed computation tasks. The first quantized value may be specifically a resource circulated and exchanged in the blockchain network, and may be referred to as a currency value, a virtual currency value, or the like.

Specifically, after performing the computation task on the subgraph data, the computing node may record global data corresponding to some completed computation tasks in the blockchain network to form corresponding blockchain data. The quantized value corresponding to the computation tasks that have been completed is the first quantized value.

In some embodiments, the computing node may alternatively record all relevant data from a previous block to a current time, for example, current global data, the computation task execution log, or the computing node status, in the new block, add the new block to the blockchain network, and obtain a corresponding first quantized value.

S504. Obtain a second quantized value corresponding to a completed computation task of which corresponding blockchain data is not formed.

The second quantized value is a value obtained by quantizing the completed computation task of which the corresponding blockchain data is not formed in the computing node. The second quantized value may measure the computing capacity of the computing node, corresponds to some other computation tasks that have been completed in the computing node. The second quantized value may be specifically a resource that is currently owned by the computing node and that can be redeemed as the first quantized value, and may be referred to as an asset value. After the computing node records the data corresponding to the completed computation task in the blockchain network to form the corresponding blockchain data, the asset value corresponding to the blockchain data may be converted into the same amount of currency value circulated in the blockchain network.

Specifically, after performing the computation task on the subgraph data, the computing node obtains corresponding global data and local data. The computing node quantizes the completed computation task, to obtain the second quantized value. In some embodiments, after performing the computation task on the subgraph data, the computing node completes a corresponding computation task. After completing the corresponding computation task, the computing node may obtain the second quantized value corresponding to the completed computation task.

In some embodiments, before writing the global data to the new block, the computing node obtains a historical second quantized value corresponding to the completed computation task. The historical second quantized value corresponds to a computation task that has been completed before the global data is written to the new block. After the global data is written to the new block, and the new block is verified by the blockchain network, the computing node subtracts the first quantized value corresponding to the corresponding computation task corresponding to the generated and written global data from the historical second quantized value, to obtain a current second quantized value.

In this way, the corresponding historical second quantized value may be converted into the first quantized value by writing the global data to the new block to form the corresponding blockchain data. The second quantized value that may be redeemed in the future is quickly and conveniently converted in an accounting manner into a corresponding first quantized value that may be circulated. In this way, a sum of the first quantized value and the current second quantized value may represent a current computing capacity of the computing node.

S506. Determine a third quantized value corresponding to an uncompleted computation task in the subgraph data.

The third quantized value is a value obtained by quantizing an uncompleted computation task in the computing node. The third quantized value may be specifically a numerical value corresponding to a computation task to be performed by the computing node, may be referred to as a liability value, and may measure the load status of the computing node. After performing and completing the uncompleted computation task, the computing node may convert a corresponding third quantized value into the same amount of second quantized value, and then convert the same amount of second quantized value into the same amount of first quantized value.

Specifically, the computing node may obtain the current uncompleted computation task in real time, and determine a corresponding third quantized value according to the uncompleted computation task. In some embodiments, the first quantized value, the second quantized value, and the third quantized value have the same unit, and all correspond to the computation tasks.

In some embodiments, a total task corresponding to the to-be-processed graph data is continuously changing, and subtasks generated by the subgraph data in the computing nodes are also continuously changing. The computing node may iteratively generate a computation task according to the subgraph data. As the algorithm is iteratively updated, a new computation task is generated in each iteration process. Each graph node in the subgraph data may be driven by the algorithm to continuously generate a unit computation task for which the computation needs to be completed.

In some embodiments, the computing node may determine, according to the subgraph data, a quantity of completed computation tasks, and content of the completed computation tasks, the global data shared in the blockchain network, and the local data, the third quantized value corresponding to the uncompleted computation task in the subgraph data.

S508. Exchange a graph node and the first quantized value between the computing nodes in a case that the second quantized value and the third quantized value do not meet an equilibrium condition.

The equilibrium condition is a preset condition used for measuring an equilibrium relationship between a current computing capacity and the load status of the computing node. The equilibrium condition is that, for example, a contrast value of a second sum of current third quantized values of the subgraph data and a first sum of current second quantized values of the subgraph data is within a specified range. The contrast value is a difference between two values. Specifically, the difference between the two values may be determined through a mathematical computation. The mathematical computation is, for example, direct division of two numbers, logarithm-taking followed by division, subtraction, or another operation followed by logarithm-taking followed by division. The contrast value may measure a difference state of one numerical value relative to another numerical value.

Specifically, a graph node and the first quantized value may be exchanged between the computing nodes in a case that the second quantized value and the third quantized value do not meet an equilibrium condition, to maintain that the second quantized value and the third quantized value meet the equilibrium condition.

In some embodiments, the specified range corresponding to the equilibrium condition may be a preset fixed range, or may be a range determined by a function that varies over time.

In some embodiments, the computing node may obtain the first sum of current second quantized values of the subgraph data, and obtain a second sum of current third quantized values of the subgraph data. The contrast value of the second sum relative to the first sum is determined. When the contrast value exceeds the specified range, the second quantized value and the third quantized value do not meet the equilibrium condition.

In some embodiments, the computing node may compute the contrast value of the second sum relative to the first sum according to the following formula:

$$\frac{\log_a^{m+|\sum_{i=1}^n \mathcal{D}_i^t|}}{\log_a^{m+|\sum_{i=1}^n C_i^t|}}$$

where both a and m are constants; a>0, and a≠1. m≥1. $|\sum_{i=1}^n \mathcal{D}_i^t|$ represents a second sum of current third quantized values of the subgraph data; and $|\sum_{i=1}^n C_i^t|$ represents a first sum of current second quantized values of the subgraph data.

In some embodiments, when the contrast value is a value obtained by taking logarithms of the second sum and the first sum and then performing division of the two logarithms, both a minimum value μ(t) and a maximum value λ(t) of the specified range are linear subtraction functions that vary over t, and μ(t)<λ(t). For example, the contrast value falling within the specified range may be represented by using the following formula:

$$\mu(t) < \frac{\log_a^{m+|\sum_{i=1}^n \mathcal{D}_i^t|}}{\log_a^{m+|\sum_{i=1}^n C_i^t|}} < \lambda(t).$$

In a specific embodiment, the constant a may be 10, and if the constant m is 1, the foregoing formula may be simplified as:

$$\mu(t) < \frac{lg(1+|\sum_{i=1}^n \mathcal{D}_i^t|)}{lg(1+|\sum_{i=1}^n C_i^t|)} < \lambda(t).$$

In some embodiments, when the contrast value is less than the minimum value of the specified range, the first quantized value of the current computing node is exchanged for a corresponding graph node of a non-current computing node, to keep the contrast value within the specified range. When the contrast value is greater than the maximum value of the specified range, the graph node of the current computing node is exchanged for a corresponding first quantized value of the non-current computing node, to keep the contrast value within the specified range.

In the foregoing embodiment, the contrast value is a contrast value of the second sum relative to the first sum. When the contrast value is less than the minimum value of the specified range, the first quantized value of the current computing node is exchanged for the corresponding graph node of the non-current computing node, and when the contrast value is greater than the maximum value of the specified range, the graph node of the current computing node is exchanged for the corresponding first quantized value of the non-current computing node, to keep the contrast value within the specified range. Correspondingly, the contrast value may alternatively be a contrast value of the first sum relative to the second sum. However, when the contrast value is greater than the maximum value of the specified range, the first quantized value of the current computing node is exchanged for the corresponding graph node of the non-current computing node, and when the contrast value is less than the minimum value of the specified range, the graph node of the current computing node is exchanged for the corresponding first quantized value of the non-current computing node, to keep the contrast value within the specified range.

In some embodiments, the step of exchanging a graph node and the first quantized value between the computing nodes specifically includes the following steps: determining, between computing nodes that are about to perform an exchange, a first party providing a to-be-exchanged graph node and a second party obtaining, in exchange, the to-be-exchanged graph node; determining a first pre-estimated quantized value of the to-be-exchanged graph node pre-estimated by the first party, and determining a second pre-estimated quantized value of the to-be-exchanged graph node pre-estimated by the second party; determining, according to the first pre-estimated quantized value and the second pre-estimated quantized value, a first quantized value used for exchanging for the to-be-exchanged graph node; and exchanging the to-be-exchanged graph node and the determined first quantized value between the computing nodes that are about to perform an exchange.

The pre-estimated quantized value is a pre-estimated value obtained by quantizing the uncompleted computation task owned by the to-be-exchanged graph node. The first pre-estimated quantized value is a value obtained by quantizing, by the first party providing the to-be-exchanged graph node, the uncompleted computation task owned by the to-be-exchanged graph node. The second pre-estimated quantized value is a value obtained by quantizing, by the second party obtaining, in exchange, the to-be-exchanged graph node, the uncompleted computation task owned by the to-be-exchanged graph node.

Specifically, when the computing node is the first party providing the to-be-exchanged graph node, the computing node may determine, according to a relationship between the second quantized value corresponding to the to-be-exchanged graph node and the second quantized value corresponding to the first party, and a relationship between the third quantized value corresponding to the to-be-exchanged graph node and the third quantized value corresponding to the first party, a first pre-estimated quantized value of the to-be-exchanged graph node pre-estimated by the first party. For example, the computing node may calculate the first pre-estimated quantized value by using the following formula:

$$y_1(v_i, k) = \alpha e^{-\beta \frac{\mathcal{D}_i - \overline{\mathcal{D}_k}}{C_i - \overline{C_k}}}$$

where $v_i$ represents the to-be-exchanged graph node; k represents the first party providing the to-be-exchanged graph node; $y1(v_i, k)$ represents the first pre-estimated quantized value of the to-be-exchanged graph node pre-estimated by the first party; $\mathcal{D}_i$ represents the third quantized value of the to-be-exchanged graph node; $C_i$ represents the second quantized value of the to-be-exchanged graph node; $\overline{\mathcal{D}_k}$ represents an average third quantized value of a graph node in a first party k providing the to-be-exchanged graph node; $\overline{C_k}$ represents an average second quantized value of a graph node in the first party k providing the to-be-exchanged graph node; α and β are corresponding parameters respectively; and e is a natural constant.

In some embodiments, when the computing node is the second party obtaining, in exchange, the to-be-exchanged graph node, when determining the second pre-estimated quantized value, the computing node may consider, after obtaining, in exchange, the to-be-exchanged graph node, an added computation task and a reduced communication distance amount required by the computing node corresponding to the second party. Therefore, the computing node may determine, according to the third quantized value of the to-be-exchanged graph node, and a communication distance between the to-be-exchanged graph node and the graph node in the second party, the second pre-estimated quantized value of the to-be-exchanged graph node pre-estimated by the second party. For example, the computing node may calculate the second pre-estimated quantized value by using the following formula:

$$y_2(v_i, l) = \alpha e^{-\gamma \mathcal{D}_i} + \Sigma_{j \in l} dist(i, j)$$

where $v_i$ represents the to-be-exchanged graph node; l represents the second party obtaining, in exchange, the to-be-exchanged graph node; $y_2(v_i, l)$ represents the second pre-estimated quantized value of the to-be-exchanged graph node pre-estimated by the second party; $\mathcal{D}_i$ represents the third quantized value of the to-be-exchanged graph node; and $\Sigma_{j \in l} dist(i, j)$ represents a sum of communication distances of the graph node j in the second party l obtaining, in exchange, the to-be-exchanged graph node and the to-be-exchanged graph node i.

In some embodiments, dist(i, j) may represent a communication distance between the graph node i and the graph node j. Because a computation amount of the communication distances between any two graph nodes in the graph data is huge, the computing node uses a mathematical approximation method to calculate the communication distances between the graph nodes. For example, the communication distances between the graph nodes may be calculated by using a local approximation method. Specifically, the communication distances between the graph nodes may be calculated by using the following formula:

$$dist(i, j) \stackrel{def}{=} \begin{cases} 1, e_{i,j} \in E \\ 0, e_{i,j} \notin E \end{cases}$$

where dist(i, j) represents a communication distance between the graph node j in the second party l obtaining, in exchange, the to-be-exchanged graph node and the to-be-exchanged graph node i; $e_{i,j} \in E$ means that graph node j is connected to the graph node i through an edge; and $e_{i,j} \notin E$ means that there is no edge between the graph node j and the graph node i.

That is, when the graph node i is connected to the graph node j through the edge, it can be approximately considered that the distance between the graph node i and the graph node j is very short. When the computing node corresponding to the second party obtains, in exchange, the to-be-exchanged graph node, the computing node may reduce a corresponding communication distance. Therefore, the second pre-estimated quantized value is higher. When the graph node its connected to the graph node j without an edge, after the computing node corresponding to the second party obtains, in exchange, the to-be-exchanged graph node, the computing node does not reduce the communication distance.

In some embodiments, the computing node may determine, according to the first pre-estimated quantized value and the second pre-estimated quantized value, the first quantized value used for exchanging for the to-be-exchanged graph node. For example, an average value of the first pre-estimated quantized value and the second pre-estimated quantized value may be calculated, and the average value is used as the first quantized value exchanged for the to-be-exchanged graph node. Alternatively, the computing node may alternatively obtain, according to a specific weight ratio, an average value after weighted summation is performed on the first pre-estimated quantized value and the second pre-estimated quantized value, use the average value after the weighted summation as the first quantized value exchanged for the to-be-exchanged graph node, and the like. Further, between the computing nodes that are about to perform an exchange, the second party may exchange the determined first quantization value for the to-be-exchanged graph node of the first party.

In the foregoing embodiment, the first quantized value, the second quantized value, and the third quantized value are separately obtained. The graph node and the first quantized value may be exchanged between the computing nodes in a case that the second quantized value and the third quantized value do not meet the equilibrium condition. The first quantized value and the second quantized value may measure the computing capacity of the computing node, and the third quantized value may measure the load status of the computing node. In this way, the computing capacity and the load status of the computing node may be quantitatively represented by a quantized value corresponding to the computation task, which is accurate and intuitive. The graph node and the first quantized value are exchanged between the computing nodes, to maintain that the second quantized value and the third quantized value meet the equilibrium condition. In this way, it is not needed to rely on a specific server or node to distribute tasks, and instead the computing nodes coordinate with each other to distribute graph nodes, and dynamically adjust distribution, to implement self-organized load balance, thereby avoiding problems of a single point of failure and network congestion of the specific server, so that task scheduling efficiency is greatly improved. In addition, use of such a self-organizing dynamic task scheduling method can be adapted to computation task scheduling of a cluster of a larger scale, and dynamically increasing or decreasing a quantity of computing nodes does not affect an existing computation task, so that high expandability is provided.

Figure 6:
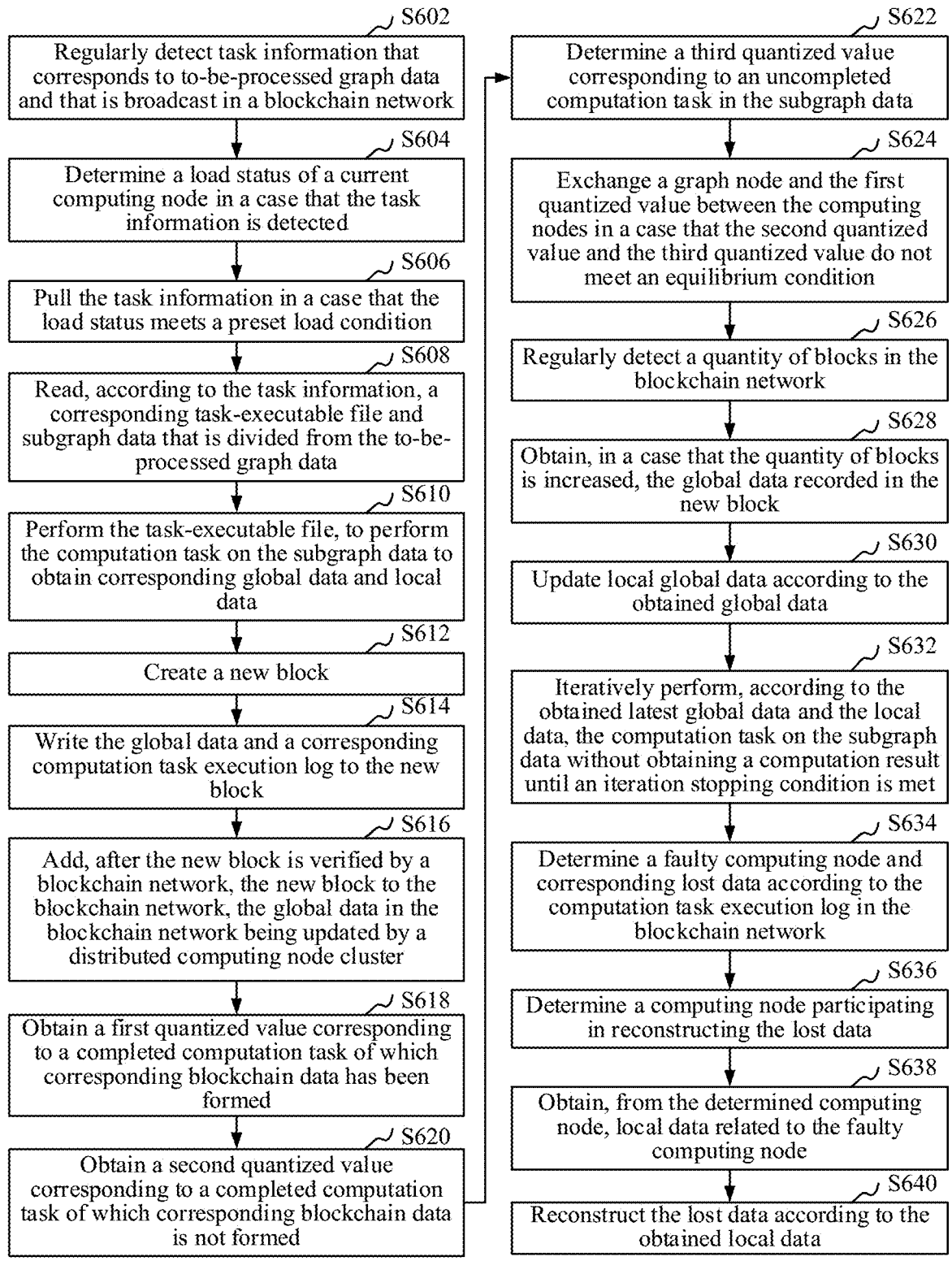
FIG. 6 is a schematic flowchart of a graph data processing method in some other embodiments.

As shown in FIG. 6, in a specific embodiment, the graph data processing method includes the following steps:

S602. Regularly detect the task information that corresponds to the to-be-processed graph data and that is broadcast in the blockchain network.

S604. Determine a load status of a current computing node in a case that the task information is detected.

S606. Pull the task information in a case that the load status meets a preset load condition.

S608. Read, according to the task information, a corresponding task-executable file and subgraph data that is divided from the to-be-processed graph data.

S610. Perform the task-executable file, to perform the computation task on the subgraph data to obtain the corresponding global data and the local data.

S612. Create a new block.

S614. Write the global data and a corresponding computation task execution log to the new block.

S616. Add, after the new block is verified by a blockchain network, the new block to the blockchain network, the global data in the blockchain network being updated by the distributed computing node cluster.

S618. Obtain a first quantized value corresponding to a completed computation task of which corresponding blockchain data has been formed.

S620. Obtain a second quantized value corresponding to a completed computation task of which corresponding blockchain data is not formed.

S622. Determine a third quantized value corresponding to an uncompleted computation task in the subgraph data.

S624. Exchange a graph node and the first quantized value between the computing nodes in a case that the second quantized value and the third quantized value do not meet an equilibrium condition.

S626. Regularly detect a quantity of blocks in the blockchain network.

S628. Obtain, in a case that the quantity of blocks is increased, the global data recorded in the new block.

S630. Update local global data according to the obtained global data.

S632. Iteratively perform, according to the obtained latest global data and the local data, the computation task on the subgraph data without obtaining a computation result until an iteration stopping condition is met.

S634. Determine a faulty computing node and corresponding lost data according to the computation task execution log in the blockchain network.

S636. Determine computing nodes participating in reconstructing the lost data.

S638. Obtain, from the determined computing node, local data related to the faulty computing node.

S640. Reconstruct the lost data according to the obtained local data.

In the foregoing graph data processing method, the to-be-processed graph data is divided into the subgraph data for distributed processing, so that efficiency of processing the graph data can be greatly improved. The global data that needs to be shared globally and that is obtained by the computing nodes in the distributed computing process of the graph data is then written to the blockchain network, and is globally shared through the blockchain network, so that communication traffic consumed by data sharing is greatly reduced. In addition, in a process of performing an iterative computation on the to-be-processed graph data, the latest global data and the local data locally buffered may be quickly and directly obtained from the blockchain network without using a centralized driver to coordinate and update the data, so that efficiency of processing the graph data is greatly improved.

FIG. 6 is a schematic flowchart of a graph data processing method in some embodiments. It is to be understood that, although the steps in the flowchart of FIG. 6 are sequentially shown according to the indication of arrows, the steps are not necessarily sequentially performed according to the sequence indicated by the arrows. Unless clearly specified in this specification, there is no strict sequence limitation on the execution of the steps, and the steps may be performed in another sequence. Moreover, at least some of the steps in FIG. 6 may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

In a specific embodiment, the control node may write the task information to the new block, and publish the task information in the blockchain network. The computing node determines its own load status after detecting the task information, pulls the task information in a case that the load status meets the preset load condition, and obtains, from the data warehouse according to the task information, the subgraph data and the task-executable file. The computing node performs the task-executable file, to compute the subgraph data. In the computation process, the computing node may write information such as the computed global data, the computation task execution log, and the status of the computing node to the blockchain network. In the computation process, the computing node may separately obtain the corresponding first quantized value, the second quantized value, and the third quantized value, and exchange a graph node and the first quantized value between the computing nodes in a case that the second quantized value and the third quantized value do not meet an equilibrium condition. In this way, a circulative iteration computation is continuously performed on the graph data without obtaining a computation result until the iteration stopping condition is met. The computing node may record the corresponding computation result in the blockchain, or store the corresponding computation result in the data warehouse.

In a specific application scenario, for example, in a traveling salesman problem (TSP), an optimal solution may be found efficiently by using the foregoing graph data processing method. The TSP problem specifically refers to how a salesman covers all cities (the graph nodes) in a shortest distance and returns to a starting city. This is a non-deterministic polynomial (NP) complete problem. Generally, an approximate solution is generally found. According to the graph data processing method in this solution, the TSP problem may be divided into shortest traversal problems in subgraphs. That is, a global optimal solution is approximately approached by searching for a local optimal solution. The global data is a path and a total length in the current to-be-processed graph data, and the local data includes an optimal path length in each piece of subgraph data. The computation process is continuously optimizing a path selection. The computing nodes share the global data by writing the global data to the blockchain network, so that network communication traffic consumed in the computation process can be greatly reduced. The global data and the local data are continuously updated, to perform the computation task, and find the optimal solution.

Figure 7:
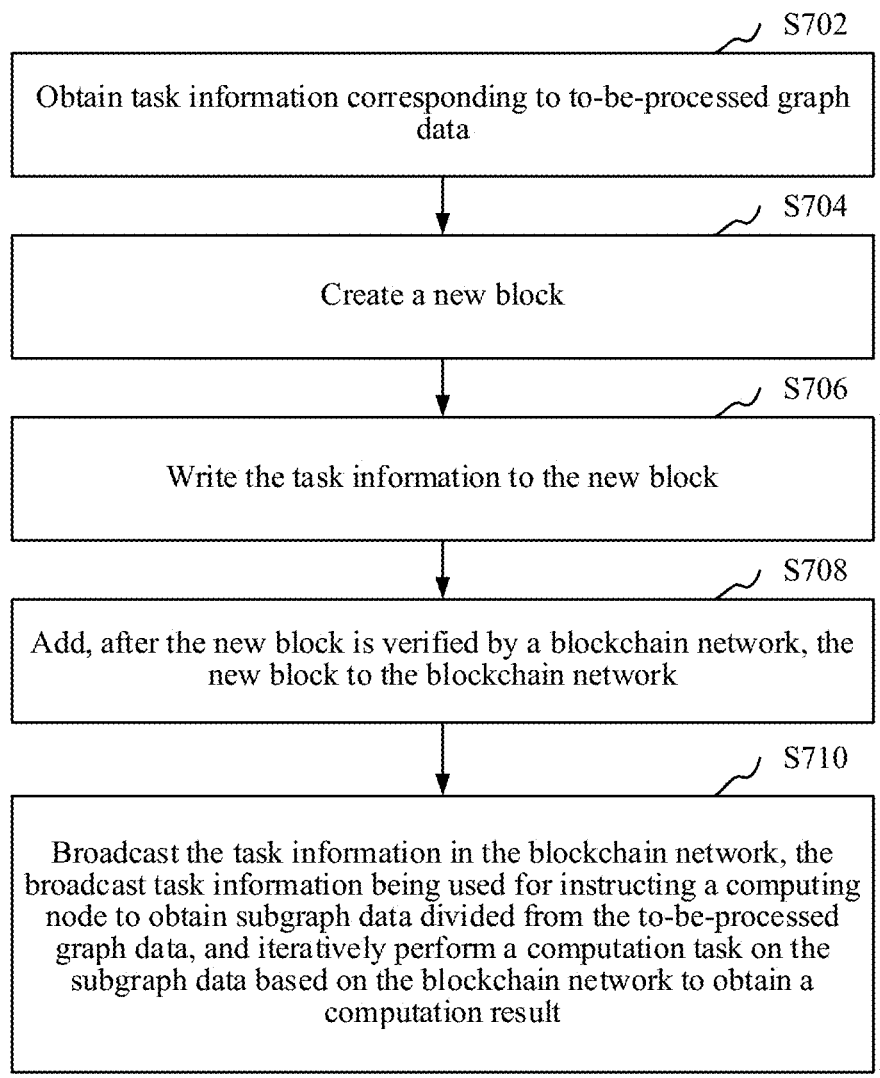
FIG. 7 is a schematic flowchart of a method for publishing a graph data computation task in some embodiments.

As shown in FIG. 7, in some embodiments, a method for publishing a graph data computation task is provided. In this embodiment, description is made mainly by using an example in which the method is applied to the control node 110 in FIG. 1. Referring to FIG. 7, the method for publishing a graph data computation task specifically includes the following steps:

S702. Obtain task information corresponding to to-be-processed graph data.

In some embodiments, the control node may obtain locally stored task information corresponding to the to-be-processed graph data, or obtain task information stored on another device through a network connection, an interface connection, or the like.

In some embodiments, the control node may receive a task adding instruction, and display a task editing interface according to the task adding instruction. A user may input the task information by using the task editing interface. The control node may obtain the task information that corresponds to the to-be-processed graph data and that is inputted to the task editing interface.

Figures 8, 9:
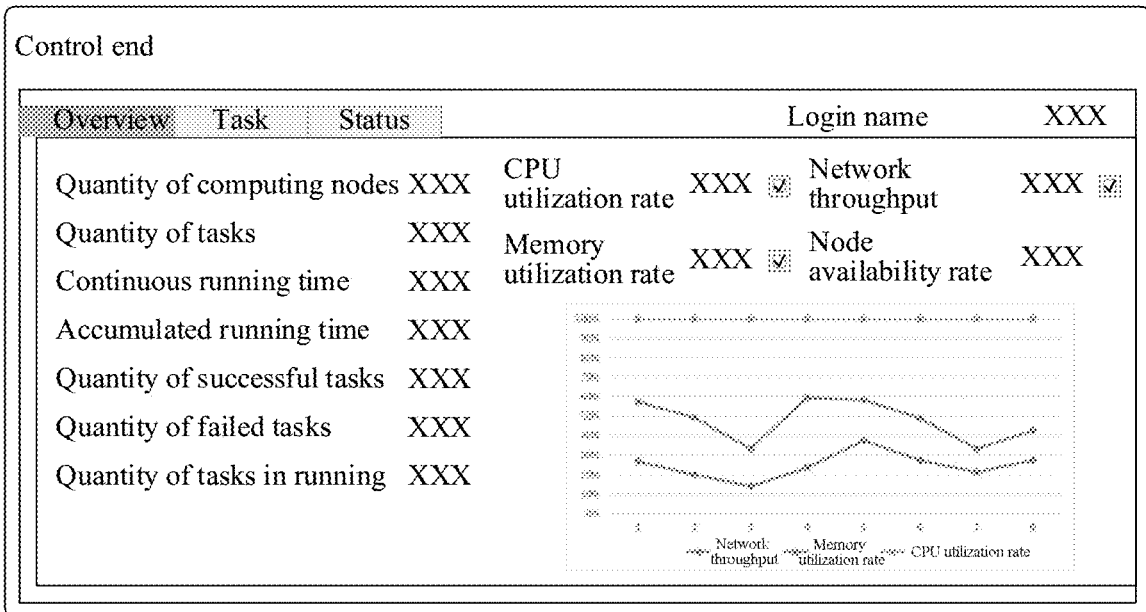
FIG. 8 is a schematic interface diagram of a task editing interface in some embodiments.
FIG. 9 is a schematic structural diagram of a task execution status display interface in some embodiments.

FIG. 8 is a schematic interface diagram of a task editing interface in some embodiments. As shown in FIG. 8, the control node may display the task editing interface, and specifically, may display information, such as a quantity of tasks, a quantity of tasks in running, a quantity of successful tasks, and a quantity of failed tasks, on an upper part of the task editing interface. Relevant information, such as a task name, a running time, a running command, and a progress of each task and a processing control that may change a state of an existing task are displayed in a middle part of the task editing interface in a form of a table. A text box of adding a task is displayed on a lower part of the task editing interface. When clicking a button "Add a task", a user may input corresponding task information, such as an algorithm parameter, an obtaining path of a task-executable file, an input data path, a result output path, and an expected completion time to a text box corresponding to the lower part of the task editing interface.

S704. Create a new block.

Specifically, the control node may create the new block when a new computation task is published, and publish the task information in a manner of writing the task information to the new block.

In some embodiments, when modifying information, such as the parameters or the result output path, of an existing or performed computation task, the control node may alternatively create the new block, and write modified content to the new block, to update the task information in the blockchain network.

In some embodiments, when the control node terminates the existing or performed computation task, the existing or performed computation task may be marked as unavailable in the blockchain. A manner of adding anew block is also used for broadcast in the blockchain network.

S706. Write the task information to the new block.

Specifically, the control node may write the obtained task information to the new block.

S708. Add, after the new block is verified by a blockchain network, the new block to the blockchain network.

In some embodiments, the blockchain network may use a corresponding consensus algorithm to perform verification on the new block. After the new block is verified by the blockchain network, the computing node may add the new block to the blockchain network.

S710. Broadcast the task information in the blockchain network, the broadcast task information being used for instructing a computing node to obtain subgraph data divided from the to-be-processed graph data, and iteratively perform a computation task on the subgraph data based on the blockchain network to obtain a computation result.

Specifically, after the new block used for recording the task information is verified by the blockchain network, the control node may broadcast the task information in the new block through the blockchain network. The broadcast task information is used for instructing the computing node to obtain the subgraph data divided from the to-be-processed graph data, and iteratively perform the computation task on the subgraph data based on the blockchain network to obtain the computation result.

In the foregoing method for publishing a graph data computation task, the obtained task information is written to the new block in the blockchain network, to broadcast to publish the task information in the blockchain network. In this way, other nodes in the blockchain network may pull corresponding task information, obtain the subgraph data divided from the to-be-processed graph data, and iteratively perform the computation task on the subgraph data based on the blockchain network to obtain the computation result. In this way, in a situation of extremely low network communication traffic consumption, the computing nodes in the blockchain network may quickly and effectively receive the published task information, so that publishing efficiency of the computation task of the graph data is greatly improved, thereby improving processing efficiency of computing the graph data.

In some embodiments, a task execution status of the computing node in the blockchain network may alternatively be displayed through the control node. Specifically, the control node may receive a task execution status display instruction; and access, according to the task execution status display instruction, a computation task execution log corresponding to a corresponding computing node in the blockchain network, to obtain task execution status information, and display a task execution status display interface. The task execution status information corresponding to the existing computation task in the blockchain network is displayed in the task execution status display interface.

FIG. 9 is a schematic structural diagram of a task execution status display interface in some embodiments. As shown in FIG. 9, information, such as a quantity of computing nodes, a quantity of tasks, a continuous running time, an accumulated running time, a quantity of successful tasks, a quantity of failed tasks, a quantity of tasks in running, a CPU utilization rate, network throughput, a memory utilization rate, and a node availability rate may be displayed in the task execution status display interface. The foregoing related information may alternatively be displayed as auxiliary information in a form of a chart. For a specific computing node, the control node may access the computation task execution log of the computing node in the blockchain network, and display the computation task execution log in the task execution status display interface.

Figure 10:
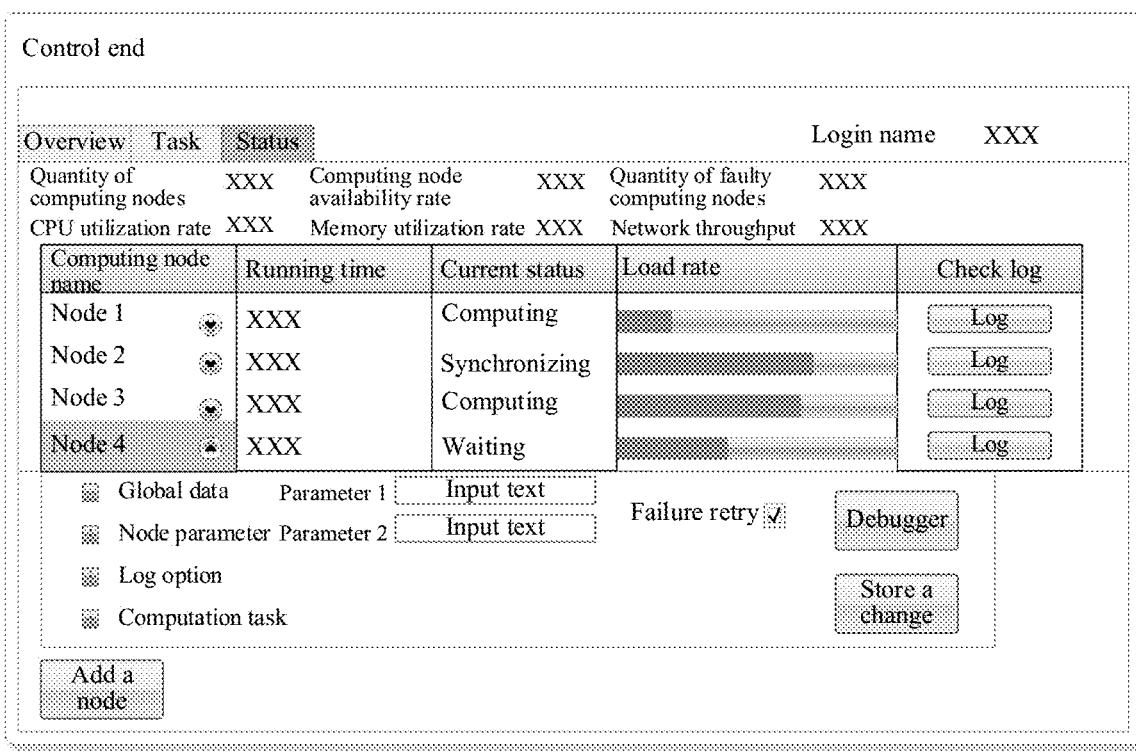
FIG. 10 is a schematic structural diagram of a computing node status display interface in some embodiments.

FIG. 10 is a schematic structural diagram of a computing node status display interface in some embodiments. As shown in FIG. 10, information, such as a quantity of computing nodes, a computing node availability rate, a quantity of faulty computing nodes, a CPU utilization rate, a memory utilization rate, and network throughput, may be displayed in the computing node status display interface. Status information, such as a computing node name, a running time, a current status, a load rate, and a check log, of the nodes may alternatively be displayed in the computing node status display interface. A text box of adding a node is displayed on a lower part of the computing node status display interface. When clicking a button "Add a node", a user may input corresponding computing node information to a text box corresponding to the lower part of the computing node status display interface, to add the computing node. The computing node information is, for example, global data, a node parameter, a log option, and a computation task.

In some embodiments, running parameters of the system, including parameters, such as a block size, an update speed, an authentication mode, and an encryption algorithm, of the blockchain network, may be set by the control node.

Figure 11:
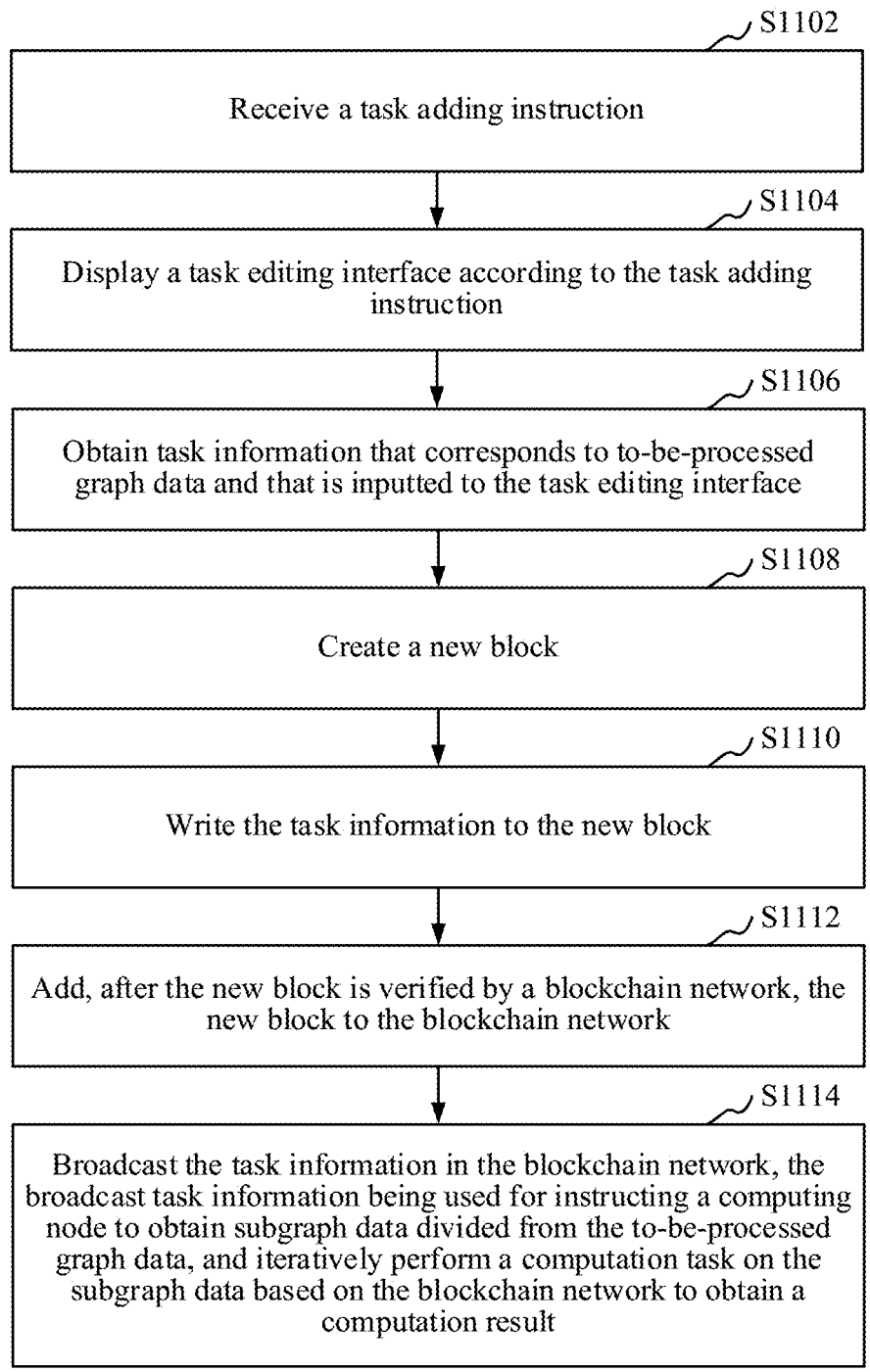
FIG. 11 is a schematic flowchart of a method for publishing a graph data computation task in some other embodiments.

As shown in FIG. 11, in a specific embodiment, the method for publishing a graph data computation task includes the following steps:

S1102. Receive a task adding instruction.

S1104. Display a task editing interface according to the task adding instruction.

S1106. Obtain task information that corresponds to the to-be-processed graph data and that is inputted to the task editing interface.

S1108. Create a new block.

S1110. Write the task information to the new block.

S1112. Add, after the new block is verified by a blockchain network, the new block to the blockchain network.

S1114. Broadcast the task information in the blockchain network, the broadcast task information being used for instructing a computing node to obtain subgraph data divided from the to-be-processed graph data, and iteratively perform a computation task on the subgraph data based on the blockchain network to obtain a computation result.

In the foregoing method for publishing a graph data computation task, the obtained task information is written to the new block in the blockchain network, to broadcast to publish the task information in the blockchain network. In this way, other nodes in the blockchain network may pull corresponding task information, obtain the subgraph data divided from the to-be-processed graph data, and iteratively perform the computation task on the subgraph data based on the blockchain network to obtain the computation result. In this way, in a situation of extremely low network communication traffic consumption, the computing nodes in the blockchain network may quickly and effectively receive the published task information, so that publishing efficiency of the computation task of the graph data is greatly improved, thereby improving processing efficiency of computing the graph data.

Figure 12:
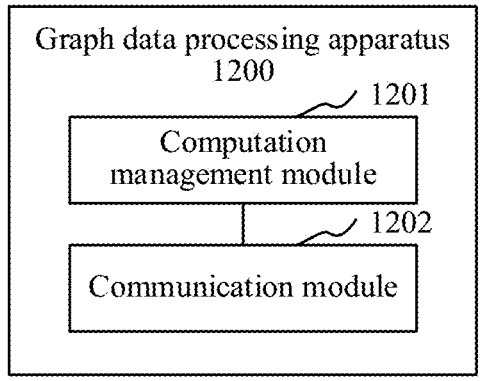
FIG. 12 is a structural block diagram of a graph data processing apparatus in some embodiments.

As shown in FIG. 12, in some embodiments, a graph data processing apparatus 1200 is provided, including a computation management module 1201 and a communication module 1202.

The computation management module 1201 is configured to obtain subgraph data divided from to-be-processed graph data.

The computation management module 1201 is further configured to perform a computation task on the subgraph data to obtain corresponding global data and local data.

The communication module 1202 is configured to write the global data to a blockchain network, the global data in the blockchain network being updated by the distributed computing node cluster.

The communication module 1202 is further configured to obtain latest global data from the blockchain network.

The computation management module 1201 is further configured to iteratively perform, according to the obtained latest global data and the local data, the computation task on the subgraph data without obtaining a computation result until an iteration stopping condition is met.

In some embodiments, the communication module 1202 is further configured to obtain task information that corresponds to the to-be-processed graph data and that is broadcast in the blockchain network. The computation management module 1201 is further configured to: read, according to the task information, a corresponding task-executable file and the subgraph data that is divided from the to-be-processed graph data, and perform the task-executable file, to perform the computation task on the subgraph data to obtain the corresponding global data and the local data.

In some embodiments, the communication module 1202 is further configured to: regularly detect the task information that corresponds to the to-be-processed graph data and that is broadcast in the blockchain network; determine a load status of a current computing node in a case that the task information is detected; and pull the task information in a case that the load status meets a preset load condition.

In some embodiments, the communication module 1202 includes a new-block generation submodule 12021. The new-block generation submodule 12021 is configured to: create a new block; write the global data to the created new block; and add, after the new block is verified by a blockchain network, the new block to the blockchain network.

In some embodiments, the new-block generation submodule 12021 is further configured to write the global data and a corresponding computation task execution log to the new block. The computation management module 1201 further includes a data recovery submodule 12011. The data recovery submodule 12011 is configured to: determine a faulty computing node and corresponding lost data according to the computation task execution log in the blockchain network; determine a computing node participating in reconstructing the lost data; obtain, from the determined computing node, local data related to the faulty computing node; and reconstruct the lost data according to the obtained local data.

In some embodiments, the data recovery submodule 12011 is further configured to: search for local data related to the faulty computing node; and share the found local data to the computing node participating in reconstructing the lost data, the shared local data being used for reconstructing the lost data.

In some embodiments, the communication module 1202 is further configured to: regularly detect a quantity of blocks in the blockchain network; obtain, in a case that the quantity of blocks is increased, the global data recorded in the new block; and update the local global data according to the obtained global data.

Figure 13:
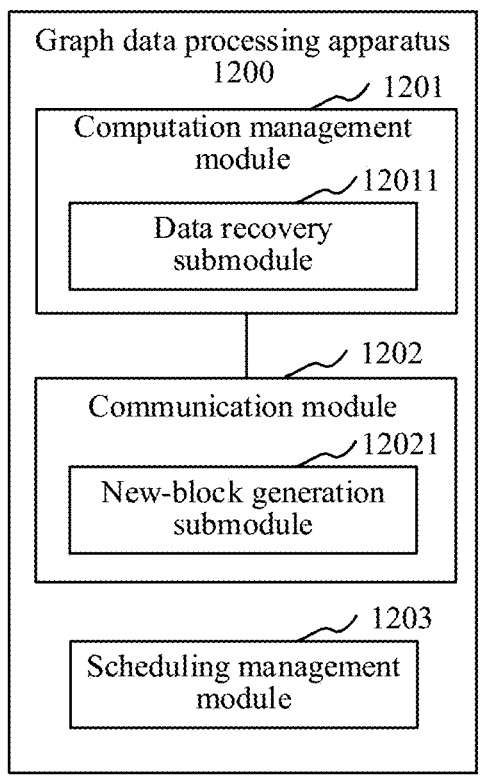
FIG. 13 is a structural block diagram of a graph data processing apparatus in some other embodiments.

As shown in FIG. 13, in some embodiments, the graph data processing apparatus 1200 further includes a scheduling management module 1203. The scheduling management module 1203 is configured to: obtain a first quantized value corresponding to a completed computation task of which corresponding blockchain data has been formed; obtain a second quantized value corresponding to a computation task of which corresponding blockchain data is not formed; determine a third quantized value corresponding to an uncompleted computation task in the subgraph data; and exchange a graph node and the first quantized value between the computing nodes in a case that the second quantized value and the third quantized value do not meet an equilibrium condition.

In the foregoing graph data processing apparatus, the to-be-processed graph data is divided into the subgraph data for distributed processing, so that efficiency of processing the graph data can be greatly improved. The global data that needs to be shared globally and that is obtained by the computing nodes in the distributed computing process of the graph data is then written to the blockchain network, and is globally shared through the blockchain network, so that communication traffic consumed by data sharing is greatly reduced. In addition, in a process of performing an iterative computation on the to-be-processed graph data, the latest global data and the local data locally buffered may be quickly and directly obtained from the blockchain network without using a centralized driver to coordinate and update the data, so that efficiency of processing the graph data is greatly improved.

Figure 14:
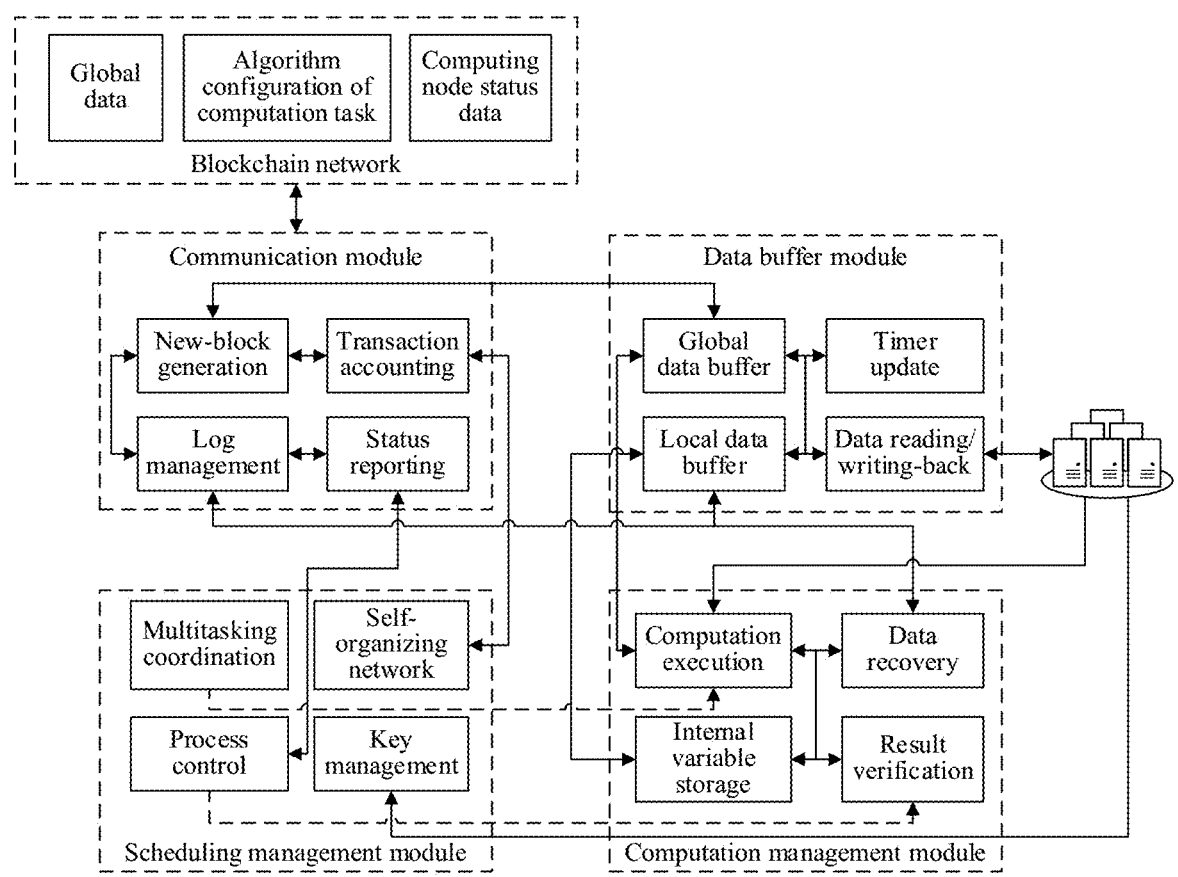
FIG. 14 is a schematic diagram of modules of a graph data processing apparatus in some embodiments.

In a specific application scenario, as shown in FIG. 14, FIG. 14 shows that, in some embodiments, the graph data processing apparatus may include a communication module, a data buffer module, a scheduling management module, and a computation management module. The communication module may include a new-block generation submodule, a transaction accounting submodule, a log management submodule, and a status reporting submodule. The data buffer module includes: a global data buffer submodule, a local data buffer submodule, a timer updating submodule, and a data reading/writing-back submodule. The scheduling management module includes: a multitasking coordination submodule, a self-organizing network submodule, a process control submodule, and a key management submodule. The computation management module includes: a computation execution submodule, an internal variable storage submodule, a data recovery submodule and a result verification submodule.

In some embodiments, as a simplified implementation of the embodiment shown in FIG. 14, the global data buffer submodule and the local data buffer submodule in the data buffer module may be placed to the computation management module, an internal variable memory is allowed to directly access the data warehouse, and the data buffer module is omitted. Work of data buffer is completely performed by the computation management module, and a policy for driving the data buffer is defined by an executed algorithm, thereby implementing a more compact structure.

The following uses FIG. 14 as an example to describe how the modules cooperate with each other to work in detail.

The communication module is responsible for all functions of communication interaction with the blockchain network, not only including maintaining normal running of the blockchain network, but also including maintaining effective information transfer between other modules and the blockchain network. Information, such as global data, algorithm configuration of the computation task, and computing node status data, is mainly exchanged with the blockchain network. The new-block generation submodule in the communication module is configured to write the current global data, the computing node status data (including data such as the second quantized value, the third quantized value, and a graph node index), and information about a graph node exchange that occurs after a previous block is generated to the new node. The transaction accounting submodule is configured to handle a situation of exchanging a graph node, that is, a transaction of the graph node and management of the first quantized value. The log management submodule is configured to: manage the computation task execution log generated by the current computing node, and pull and organize, from a blockchain according to a requirement, the required computation task execution log. This is very important in the data recovery process of the faulty computing node. The status reporting submodule obtains status information of the computing node from the computation management module, including a central processing unit (CPU) memory resource consumed by currently performing the computation task, an algorithm name and type, error times, and the like.

In some embodiments, the communication module may further include a verification module, to ensure reliability of new-block generation and accounting.

The data buffer module includes four submodules: a global data buffer submodule, a local data buffer submodule, a timer updating submodule, and a data reading/writing-back submodule. A data update policy is similar to common FIFO and LFU policies, and an oldest buffer is replaced under the driving of a time.

The scheduling management module is the core of the whole distributed graph computing system, and drives the whole system to run orderly. The self-organizing network submodule is responsible for execution of a self-organizing policy, including determining the first quantized value used for exchanging the graph nodes, a transaction decision, asset accounting and management, and the like. The multitasking coordination submodule controls data of calculating performing a plurality of different tasks. Common queue scheduling and a priority scheduling method may be used for control coordination herein. The key management submodule obtains authorization information of the computing node and a corresponding key from the data warehouse. The process control submodule monitors integrity and validity of a computation process, and in particular, to relevant context processing when the computation process needs to be rolled back.

The computation execution submodule in the computation management module obtains, form the data warehouse according to the instruction of the scheduling management module, a required task-executable file, to complete a related computation. A corresponding variable is stored in an internal variable storage submodule, and isolated storage of data is needed according to different computation tasks and the graph node. The data recovery submodule is configured to attempt, when a failed computing node occurs in the blockchain network, to effectively recover the data stored in the data recovery submodule.

Compared with a centralized graph data processing apparatus, the graph data processing apparatus in the embodiments of this application has the following advantages:

High reliability is that, because all the computing nodes may perform computation actively, disconnection of a single computing node does not affect the whole computation, and leads to failure of the task, so that the whole system has relatively high reliability.

High flexibility is that, as described in a previous point, a newly added node may also quickly and adaptively join the computing network, so that a scale of the computing network can be flexibly expanded.

Adaptive heterogeneous computing is that, due to the autonomy of load balance, a heterogeneous device joins the network may also be coordinated in a similar manner, and a bottleneck is not generated due to differences in terms of a computing capacity and a computing mode.

Figure 15:
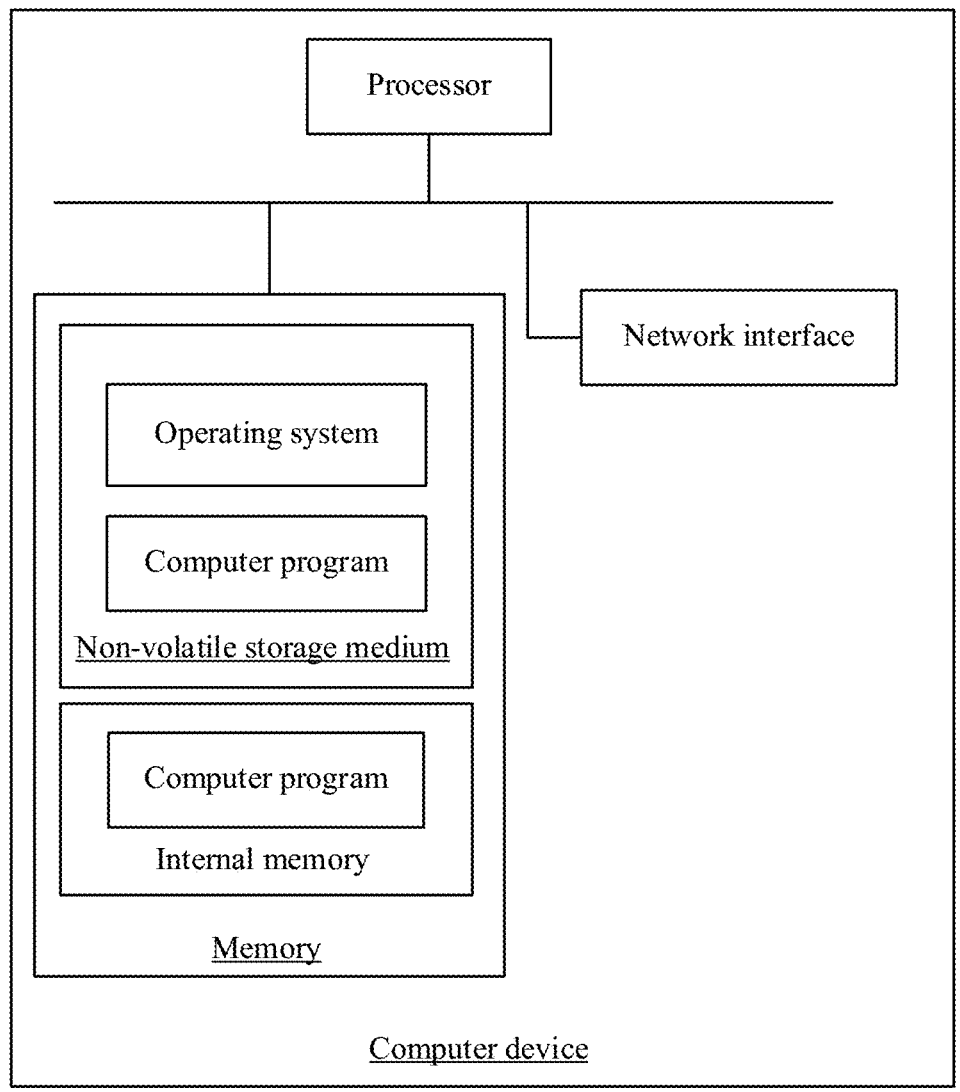
FIG. 15 is a structural block diagram of a computer device in some embodiments.

FIG. 15 is a diagram of an internal structure of a computer device in some embodiments. The computer device may be specifically a computer device distributed by the computing node 120 in FIG. 1. As shown in FIG. 15, the computer device includes a processor, a memory, and a network interface connected through a system bus. The memory includes a non-volatile storage medium and an internal memory. The non-volatile storage medium of the computer device stores an operating system, and may further store a computer program, the computer program, when executed by the processor, causing the processor to perform the graph data processing method. The internal memory may also store a computer program. The computer program, when executed by the processor, may cause the processor to perform the graph data processing method.

A person skilled in the art may understand that, the structure shown in FIG. 15 is only a block diagram of a partial structure related to the solution of this application, and does not constitute a limitation to the computer device to which the solution of this application is applied. Specifically, the computer device may include more or fewer components than those shown in the figure, or some components may be combined, or a different component deployment may be used.

In some embodiments, the graph data processing apparatus provided in this application may be implemented in a form of a computer program, and the computer program may be run on the computer device shown in FIG. 15. The memory of the computer device may store program modules forming the graph data processing apparatus, for example, a computation management module and a communication module shown in FIG. 12. The computer program formed by the program modules causes the processor to perform the steps in the graph data processing method in the embodiments of this application described in this specification.

For example, the computer device shown in FIG. 15 may perform steps S202, S204, and S210 by using the computation management module in the graph data processing apparatus shown in FIG. 12. The computer device may perform steps S206 and S208 by using the communication module.

Figure 16:
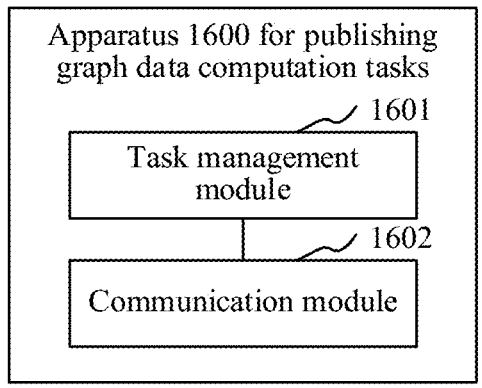
FIG. 16 is a structural block diagram of an apparatus for publishing a graph data computation task in some embodiments.

As shown in FIG. 16, in some embodiments, an apparatus 1600 for publishing a graph data computation task is provided, including a task management module 1601 and a communication module 1602.

The task management module 1601 is configured to obtain task information corresponding to to-be-processed graph data.

The communication module 1602 is configured to create a new block.

The communication module 1602 is further configured to write the task information to the new block.

The communication module 1602 is further configured to add, after the new block is verified by a blockchain network, the new block to the blockchain network.

The communication module 1602 is further configured to broadcast the task information in the blockchain network, the broadcast task information being used for instructing a computing node to obtain subgraph data divided from the to-be-processed graph data, and iteratively perform a computation task on the subgraph data based on the blockchain network to obtain a computation result.

In some embodiments, the task management module 1601 is further configured to: receive a task adding instruction; display a task editing interface according to the task adding instruction; and obtain task information that corresponds to the to-be-processed graph data and that is inputted to the task editing interface.

In the foregoing apparatus for publishing a graph data computation task, the obtained task information is written to the new block in the blockchain network, to broadcast to publish the task information in the blockchain network. In this way, other nodes in the blockchain network may pull corresponding task information, obtain the subgraph data divided from the to-be-processed graph data, and iteratively perform the computation task on the subgraph data based on the blockchain network to obtain the computation result. In this way, in a situation of extremely low network communication traffic consumption, the computing nodes in the blockchain network may quickly and effectively receive the published task information, so that publishing efficiency of the computation task of the graph data is greatly improved, thereby improving processing efficiency of computing the graph data.

Figure 17:
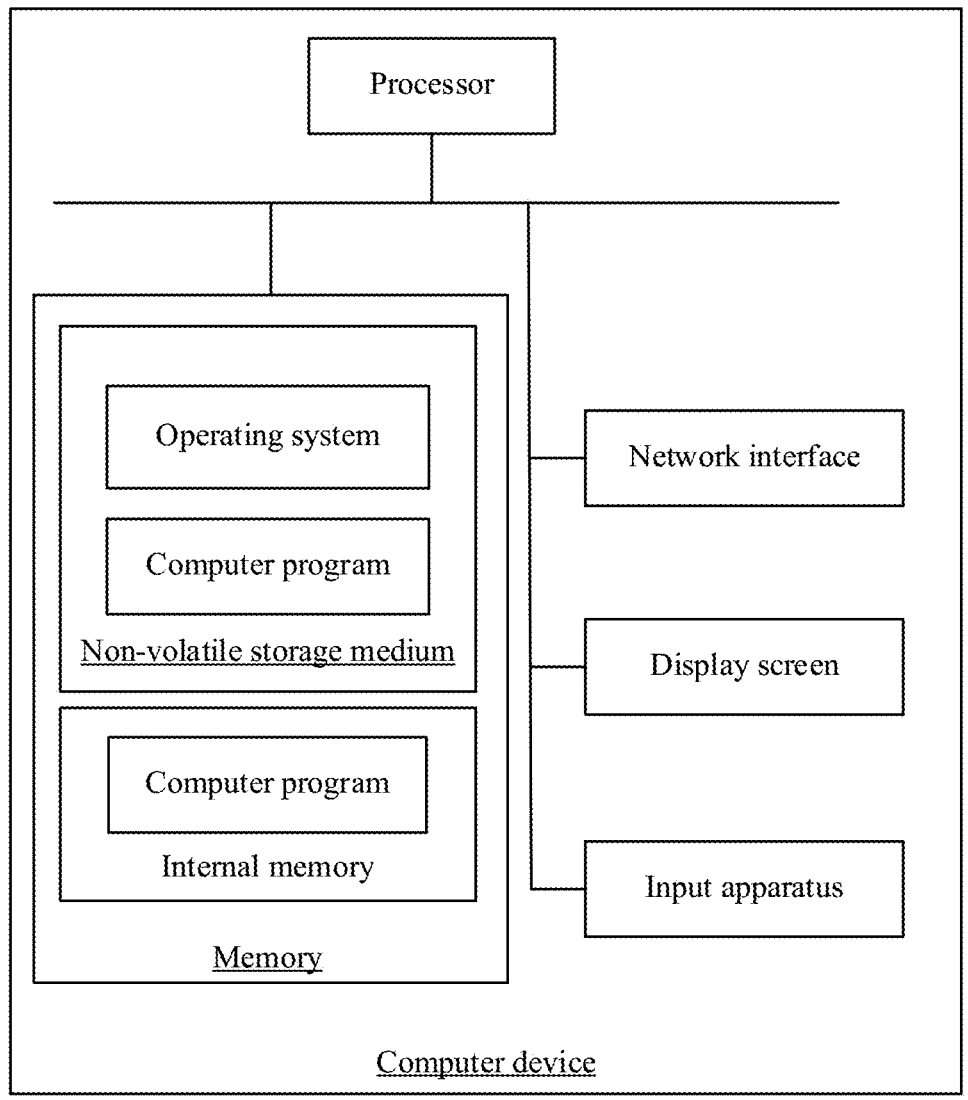
FIG. 17 is a structural block diagram of a computer device in some embodiments.

FIG. 17 is a diagram of an internal structure of a computer device in some embodiments. The computer device may be specifically a control node 110 in FIG. 1. As shown in FIG. 17, the computer device includes a processor, a memory, a network interface, an input apparatus and a display screen that are connected through a system bus. The memory includes a non-volatile storage medium and an internal memory. The non-volatile storage medium of the computer device stores an operating system, and may further store a computer program, the computer program, when executed by the processor, causing the processor to perform the method for publishing a graph data computation task. The internal memory may also store a computer program. The computer program, when executed by the processor, may cause the processor to perform the method for publishing a graph data computation task. The display screen of the computer device may be a liquid crystal display screen or an electronic ink display screen. The input device of the computer device may be a touch layer covering the display screen, or may be a key, a trackball or a touchpad disposed on a housing of the computer device, or may be an external keyboard, a touchpad, a mouse, or the like.

A person skilled in the art may understand that, the structure shown in FIG. 17 is only a block diagram of a partial structure related to the solution of this application, and does not constitute a limitation to the computer device to which the solution of this application is applied. Specifically, the computer device may include more or fewer components than those shown in the figure, or some components may be combined, or a different component deployment may be used.

In some embodiments, the apparatus for publishing a graph data computation task provided in this application may be implemented in a form of a computer program, and the computer program may be run on the computer device shown in FIG. 17. The memory of the computer device may store program modules forming the apparatus for publishing a graph data computation task, for example, the task management module and the communication module shown in FIG. 16. The computer program formed by the program modules causes the processor to perform the steps in the method for publishing a graph data computation task in the embodiments of this application described in this specification.

For example, the computer device shown in FIG. 17 may perform step S702 by using the task management module in the apparatus for publishing a graph data computation task shown in FIG. 16. The computer device may perform steps S704, S706, and S708 by using the communication module.

In some embodiments, a distributed graph computing system the control node is provided in this solution, including a computing node and a control node. The control node is configured to: obtain task information corresponding to to-be-processed graph data; create a new block; write the task information to the new block; add, after the new block is verified by a blockchain network, the new block to the blockchain network; and broadcast the task information in the blockchain network, the broadcast task information being used for instructing the computing node to obtain subgraph data divided from the to-be-processed graph data, and iteratively perform a computation task on the subgraph data based on the blockchain network to obtain a computation result. The computing node is configured to: obtain the subgraph data divided from the to-be-processed graph data; perform the computation task on the subgraph data to obtain corresponding global data and local data; write the global data to the blockchain network, the global data of the blockchain network being updated by a distributed computing node cluster; obtain latest global data from the blockchain network; and iteratively perform, according to the obtained latest global data and the local data, the computation task on the subgraph data without obtaining the computation result until an iteration stopping condition is met.

In the distributed graph computing system, the control node writes the obtained task information to the new block in the blockchain network, to broadcast to publish the task information in the blockchain network. In a situation of extremely low network communication traffic consumption, the computing nodes in the blockchain network may quickly and effectively receive the published task information, so that publishing efficiency of the computation task of the graph data is greatly improved. After obtaining the task information, the computing node may divide the to-be-processed graph data into the subgraph data for distributed processing, so that efficiency of processing the graph data can be greatly improved. The global data that needs to be shared globally and that is obtained by the computing nodes in the distributed computing process of the graph data is then written to the blockchain network, and is globally shared through the blockchain network, so that communication traffic consumed by data sharing is greatly reduced. In addition, in a process of performing an iterative computation on the to-be-processed graph data, the latest global data and the local data locally buffered may be quickly and directly obtained from the blockchain network without using a centralized driver to coordinate and update the data, so that efficiency of processing the graph data is greatly improved.

In some embodiments, a computer device is provided, including a memory and a processor, the memory storing a computer program, the computer program, when executed by the processor, causing the processor to perform the following steps: obtaining subgraph data divided from to-be-processed graph data; perform a computation task on the subgraph data to obtain corresponding global data and local data; writing the global data to a blockchain network, the global data of the blockchain network being updated by a distributed computing node cluster; obtaining latest global data from the blockchain network; and iteratively performing, according to the obtained latest global data and the local data, the computation task on the subgraph data without obtaining the computation result until an iteration stopping condition is met.

In some embodiments, the computer program, when performing the step of obtaining subgraph data divided from to-be-processed graph data, causes the processor to specifically perform the following steps: obtaining task information that corresponds to the to-be-processed graph data and that is broadcast in the blockchain network; and reading, according to the task information, a corresponding task-executable file and the subgraph data that is divided from the to-be-processed graph data. The computer program, when performing the step of performing a computation task on the subgraph data to obtain corresponding global data and local data, causes the processor to specifically perform the following step: performing the task-executable file, to perform the computation task on the subgraph data to obtain the corresponding global data and the local data.

In some embodiments, the computer program, when performing the step of obtaining task information that corresponds to the to-be-processed graph data and that is broadcast in the blockchain network, causes the processor to specifically perform the following steps: regularly detecting the task information that corresponds to the to-be-processed graph data and that is broadcast in the blockchain network; determining a load status of a current computing node in a case that the task information is detected; and pulling the task information in a case that the load status meets a preset load condition.

In some embodiments, the computer program, when performing the step of writing the global data to a blockchain network, causes the processor to specifically perform the following steps: creating a new block; writing the global data to the created new block; and adding, after the new block is verified by a blockchain network, the new block to the blockchain network.

In some embodiments, the computer program, when performing the step of writing the global data to the created new block, causes the processor to specifically perform the following step: writing the global data and a corresponding computation task execution log to the new block. The computer program further causes the processor to perform the following steps: determining a faulty computing node and corresponding lost data according to the computation task execution log in the blockchain network; determining computing nodes participating in reconstructing the lost data; obtaining, from the determined computing node, local data related to the faulty computing node; and reconstructing the lost data according to the obtained local data.

In some embodiments, the computer program further causes the processor to perform the following steps: searching for local data related to the faulty computing node; and sharing the found local data to the computing nodes participating in reconstructing the lost data, the shared local data being used for reconstructing the lost data.

In some embodiments, the computer program, when performing the step of obtaining latest global data from the blockchain network, causes the processor to specifically perform the following steps: regularly detecting a quantity of blocks in the blockchain network; obtaining, in a case that the quantity of blocks is increased, the global data recorded in a new block; and updating local global data according to the obtained global data.

In some embodiments, the computer program further causes the processor to perform the following steps: obtaining a first quantized value corresponding to a completed computation task of which corresponding blockchain data has been formed; obtaining a second quantized value corresponding to a completed computation task of which corresponding blockchain data is not formed; determining a third quantized value corresponding to an uncompleted computation task in the subgraph data; and exchanging a graph node and the first quantized value between the computing nodes in a case that the second quantized value and the third quantized value do not meet an equilibrium condition.

In the foregoing computer device, the to-be-processed graph data is divided into the subgraph data for the distributed processing, so that efficiency of processing the graph data can be greatly improved. The global data that needs to be shared globally and that is obtained by the computing nodes in the distributed computing process of the graph data is then written to the blockchain network, and is globally shared through the blockchain network, so that communication traffic consumed by data sharing is greatly reduced. In addition, in a process of performing an iterative computation on the to-be-processed graph data, the latest global data and the local data locally buffered may be quickly and directly obtained from the blockchain network without using a centralized driver to coordinate and update the data, so that efficiency of processing the graph data is greatly improved.

In some embodiments, a computer device is provided, including a memory and a processor, the memory storing a computer program, the computer program, when executed by the processor, causing the processor to perform the following steps: obtaining task information corresponding to to-be-processed graph data; creating a new block; writing the task information to the new block; adding, after the new block is verified by a blockchain network, the new block to the blockchain network; and broadcasting the task information in the blockchain network, the broadcast task information being used for instructing the computing node to obtain subgraph data divided from the to-be-processed graph data, and iteratively perform a computation task on the subgraph data based on the blockchain network to obtain a computation result.

In some embodiments, the computer program, when performing the step of obtaining task information corresponding to to-be-processed graph data, causes the processor to specifically perform the following steps: receiving a task adding instruction; displaying a task editing interface according to the task adding instruction; and obtaining task information that corresponds to the to-be-processed graph data and that is inputted to the task editing interface.

In the foregoing computer device, the obtained task information is written to the new block in the blockchain network, to broadcast to publish the task information in the blockchain network. In this way, other nodes in the blockchain network may pull corresponding task information, obtain the subgraph data divided from the to-be-processed graph data, and iteratively perform the computation task on the subgraph data based on the blockchain network to obtain the computation result. In this way, in a situation of extremely low network communication traffic consumption, the computing nodes in the blockchain network may quickly and effectively receive the published task information, so that publishing efficiency of the computation task of the graph data is greatly improved, thereby improving processing efficiency of computing the graph data.

A computer-readable storage medium is provided, storing a computer program, the computer program, when executed by a processor, performing the following steps: obtaining subgraph data divided from to-be-processed graph data; performing computation task on the subgraph data to obtain corresponding global data and local data; writing the global data to a blockchain network, the global data of the blockchain network being updated by a distributed computing node cluster; obtaining latest global data from the blockchain network; and iteratively performing, according to the obtained latest global data and the local data, the computation task on the subgraph data without obtaining the computation result until an iteration stopping condition is met.

In some embodiments, the computer program, when performing the step of obtaining subgraph data divided from to-be-processed graph data, causes the processor to specifically perform the following steps: obtaining task information that corresponds to the to-be-processed graph data and that is broadcast in the blockchain network; and reading, according to the task information, a corresponding task-executable file and the subgraph data that is divided from the to-be-processed graph data. The computer program, when performing the step of performing a computation task on the subgraph data to obtain corresponding global data and local data, causes the processor to specifically perform the following step: performing the task-executable file, to perform the computation task on the subgraph data to obtain the corresponding global data and the local data.

In some embodiments, the computer program, when performing the step of obtaining task information that corresponds to the to-be-processed graph data and that is broadcast in the blockchain network, causes the processor to specifically perform the following steps: regularly detecting the task information that corresponds to the to-be-processed graph data and that is broadcast in the blockchain network; determining a load status of a current computing node in a case that the task information is detected; and pulling the task information in a case that the load status meets a preset load condition.

In some embodiments, the computer program, when performing the step of writing the global data to a blockchain network, causes the processor to specifically perform the following steps: creating a new block; writing the global data to the created new block; and adding, after the new block is verified by a blockchain network, the new block to the blockchain network.

In some embodiments, the computer program, when performing the step of writing the global data to the created new block, causes the processor to specifically perform the following step: writing the global data and a corresponding computation task execution log to the new block. The computer program further causes the processor to perform the following steps: determining a faulty computing node and corresponding lost data according to the computation task execution log in the blockchain network; determining computing nodes participating in reconstructing the lost data; obtaining, from the determined computing node, local data related to the faulty computing node; and reconstructing the lost data according to the obtained local data.

In some embodiments, the computer program further causes the processor to perform the following steps: searching for local data related to the faulty computing node; and sharing the found local data to the computing nodes participating in reconstructing the lost data, the shared local data being used for reconstructing the lost data.

In some embodiments, the computer program, when performing the step of obtaining latest global data from the blockchain network, causes the processor to specifically perform the following steps: regularly detecting a quantity of blocks in the blockchain network; obtaining, in a case that the quantity of blocks is increased, the global data recorded in a new block; and updating local global data according to the obtained global data.

In some embodiments, the computer program further causes the processor to perform the following steps: obtaining a first quantized value corresponding to a completed computation task of which corresponding blockchain data has been formed; obtaining a second quantized value corresponding to a completed computation task of which corresponding blockchain data is not formed; determining a third quantized value corresponding to an uncompleted computation task in the subgraph data; and exchanging a graph node and the first quantized value between the computing nodes in a case that the second quantized value and the third quantized value do not meet an equilibrium condition.

The foregoing computer-readable storage medium divides the to-be-processed graph data into the subgraph data for distributed processing, so that efficiency of processing the graph data can be greatly improved. The global data that needs to be shared globally and that is obtained by the computing nodes in the distributed computing process of the graph data is then written to the blockchain network, and is globally shared through the blockchain network, so that communication traffic consumed by data sharing is greatly reduced. In addition, in a process of performing an iterative computation on the to-be-processed graph data, the latest global data and the local data locally buffered may be quickly and directly obtained from the blockchain network without using a centralized driver to coordinate and update the data, so that efficiency of processing the graph data is greatly improved.

A computer-readable storage medium is provided, storing a computer program, the computer program, when executed by the processor, performing the following steps: obtaining task information corresponding to to-be-processed graph data; creating a new block; writing the task information to the new block; adding, after the new block is verified by a blockchain network, the new block to the blockchain network; and broadcasting the task information in the blockchain network, the broadcast task information being used for instructing the computing node to obtain subgraph data divided from the to-be-processed graph data, and iteratively perform a computation task on the subgraph data based on the blockchain network to obtain a computation result.

In some embodiments, the computer program, when performing the step of obtaining task information corresponding to to-be-processed graph data, causes the processor to specifically perform the following steps: receiving a task adding instruction; displaying a task editing interface according to the task adding instruction; and obtaining task information that corresponds to the to-be-processed graph data and that is inputted to the task editing interface.

In the foregoing computer-readable storage medium, the obtained task information is written to the new block in the blockchain network, to broadcast to publish the task information in the blockchain network. In this way, other nodes in the blockchain network may pull corresponding task information, obtain the subgraph data divided from the to-be-processed graph data, and iteratively perform the computation task on the subgraph data based on the blockchain network to obtain the computation result. In this way, in a situation of extremely low network communication traffic consumption, the computing nodes in the blockchain network may quickly and effectively receive the published task information, so that publishing efficiency of the computation task of the graph data is greatly improved, thereby improving processing efficiency of computing the graph data.

A person of ordinary skill in the art may understand that all or some processes in the method in the foregoing embodiments may be implemented by a computer program. The program may be stored in a non-volatile computer-readable storage medium, and the program, when executed, may include the processes of the foregoing method embodiments. Any reference to the memory, storage, database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external buffer. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application, and descriptions thereof are in detail, but are not be understood as a limitation to the patent scope of this application. A person of ordinary skill in the art may further make variations and improvements without departing from the ideas of this application, and the variations and improvements shall fall within the protection scope of this application. Therefore, the protection scope of the patent of this application shall be subject to the appended claims.

What is claimed is:

1. A graph data processing method, performed by a distributed computer node cluster including a plurality of computer devices, each computer device having a processor and memory storing a plurality of computer programs to be executed by the processor, and the method comprising:
   obtaining subgraph data divided from to-be-processed graph data;
   performing a computation task on the subgraph data to obtain corresponding global data and local data;
   writing the global data to a blockchain network, the global data in the blockchain network being updated by the distributed computing node cluster;
   obtaining latest global data from the blockchain network; and
   iteratively performing, according to the obtained latest global data and the local data, the computation task on the subgraph data without obtaining a computation result until an iteration stopping condition is met.

2. The method according to claim 1, wherein the obtaining subgraph data divided from to-be-processed graph data comprises:
   obtaining task information that corresponds to the to-be-processed graph data and that is broadcast in the blockchain network; and
   reading, according to the task information, a corresponding task-executable file and the subgraph data that is divided from the to-be-processed graph data; and
   the performing a computation task on the subgraph data to obtain corresponding global data and local data comprises:
   performing the task-executable file, to perform the computation task on the subgraph data to obtain the corresponding global data and the local data.

3. The method according to claim 2, wherein the obtaining task information that corresponds to the to-be-processed graph data and that is broadcast in the blockchain network comprises:
   regularly detecting the task information that corresponds to the to-be-processed graph data and that is broadcast in the blockchain network;
   determining a load status of a current computing node in a case that the task information is detected; and
   pulling the task information in a case that the load status meets a preset load condition.

4. The method according to claim 1, wherein the writing the global data to a blockchain network comprises:
   creating a new block;
   writing the global data to the created new block; and
   adding, after the new block is verified by a blockchain network, the new block to the blockchain network.

5. The method according to claim 4, wherein the writing the global data to the created new block comprises: writing the global data and a corresponding computation task execution log to the new block; and
   the method further comprises:
   determining a faulty computing node and corresponding lost data according to the computation task execution log in the blockchain network;
   determining a computing node participating in reconstructing the lost data;
   obtaining, from the determined computing node, local data related to the faulty computing node; and reconstructing the lost data according to the obtained local data.

6. The method according to claim 5, the method further comprising:
searching for local data related to the faulty computing node; and
sharing the found local data to the computing nodes participating in reconstructing the lost data, the shared local data being used for reconstructing the lost data.

7. The method according to claim 1, wherein the obtaining latest global data from the blockchain network comprises:
regularly detecting a quantity of blocks in the blockchain network;
obtaining, in a case that the quantity of blocks is increased, global data recorded in a new block; and
updating local global data according to the obtained global data.

8. The method according to claim 1, the method further comprising:
obtaining a first quantized value corresponding to a completed computation task of which corresponding blockchain data has been formed;
obtaining a second quantized value corresponding to a completed computation task of which corresponding blockchain data is not formed;
determining a third quantized value corresponding to an uncompleted computation task in the subgraph data; and
exchanging a graph node and the first quantized value between the computing nodes in a case that the second quantized value and the third quantized value do not meet an equilibrium condition.

9. A distributed computer node cluster including a plurality of computer devices, each computer device having a processor, memory and a plurality of computer programs stored in the memory that, when executed by the processors, cause the distributed computer node cluster to perform a plurality of operations including:
obtaining subgraph data divided from to-be-processed graph data;
performing a computation task on the subgraph data to obtain corresponding global data and local data;
writing the global data to a blockchain network, the global data in the blockchain network being updated by the distributed computing node cluster;
obtaining latest global data from the blockchain network; and
iteratively performing, according to the obtained latest global data and the local data, the computation task on the subgraph data without obtaining a computation result until an iteration stopping condition is met.

10. The distributed computer node cluster according to claim 9, wherein the obtaining subgraph data divided from to-be-processed graph data comprises:
obtaining task information that corresponds to the to-be-processed graph data and that is broadcast in the blockchain network; and
reading, according to the task information, a corresponding task-executable file and the subgraph data that is divided from the to-be-processed graph data; and
the performing a computation task on the subgraph data to obtain corresponding global data and local data comprises:
performing the task-executable file, to perform the computation task on the subgraph data to obtain the corresponding global data and the local data.

11. The distributed computer node cluster according to claim 10, wherein the obtaining task information that corresponds to the to-be-processed graph data and that is broadcast in the blockchain network comprises:
regularly detecting the task information that corresponds to the to-be-processed graph data and that is broadcast in the blockchain network;
determining a load status of a current computing node in a case that the task information is detected; and
pulling the task information in a case that the load status meets a preset load condition.

12. The distributed computer node cluster according to claim 9, wherein the writing the global data to a blockchain network comprises:
creating a new block;
writing the global data to the created new block; and
adding, after the new block is verified by a blockchain network, the new block to the blockchain network.

13. The distributed computer node cluster according to claim 12, wherein the writing the global data to the created new block comprises: writing the global data and a corresponding computation task execution log to the new block; and the plurality of operations further comprise:
determining a faulty computing node and corresponding lost data according to the computation task execution log in the blockchain network;
determining a computing node participating in reconstructing the lost data;
obtaining, from the determined computing node, local data related to the faulty computing node; and
reconstructing the lost data according to the obtained local data.

14. The distributed computer node cluster according to claim 13, wherein the plurality of operations further comprise:
searching for local data related to the faulty computing node; and
sharing the found local data to the computing nodes participating in reconstructing the lost data, the shared local data being used for reconstructing the lost data.

15. The distributed computer node cluster according to claim 9, wherein the obtaining latest global data from the blockchain network comprises:
regularly detecting a quantity of blocks in the blockchain network;
obtaining, in a case that the quantity of blocks is increased, global data recorded in a new block; and
updating local global data according to the obtained global data.

16. The distributed computer node cluster according to claim 9, wherein the plurality of operations further comprise:
obtaining a first quantized value corresponding to a completed computation task of which corresponding blockchain data has been formed;
obtaining a second quantized value corresponding to a completed computation task of which corresponding blockchain data is not formed;
determining a third quantized value corresponding to an uncompleted computation task in the subgraph data; and
exchanging a graph node and the first quantized value between the computing nodes in a case that the second quantized value and the third quantized value do not meet an equilibrium condition.

17. A non-transitory computer-readable storage medium storing a plurality of computer programs, the computer programs, when executed by a distributed computer node cluster including a plurality of computer devices, each computer device having a processor, causing the distributed computer node cluster to perform a plurality of operations including:

obtaining subgraph data divided from to-be-processed graph data;

performing a computation task on the subgraph data to obtain corresponding global data and local data;

writing the global data to a blockchain network, the global data in the blockchain network being updated by the distributed computing node cluster;

obtaining latest global data from the blockchain network; and iteratively performing, according to the obtained latest global data and the local data, the computation task on the subgraph data without obtaining a computation result until an iteration stopping condition is met.

18. The non-transitory computer-readable storage medium according to claim 17, wherein the obtaining subgraph data divided from to-be-processed graph data comprises:

obtaining task information that corresponds to the to-be-processed graph data and that is broadcast in the blockchain network; and reading, according to the task information, a corresponding task-executable file and the subgraph data that is divided from the to-be-processed graph data; and the performing a computation task on the subgraph data to obtain corresponding global data and local data comprises:

performing the task-executable file, to perform the computation task on the subgraph data to obtain the corresponding global data and the local data.

19. The non-transitory computer-readable storage medium according to claim 18, wherein the obtaining task information that corresponds to the to-be-processed graph data and that is broadcast in the blockchain network comprises:

regularly detecting the task information that corresponds to the to-be-processed graph data and that is broadcast in the blockchain network;

determining a load status of a current computing node in a case that the task information is detected; and pulling the task information in a case that the load status meets a preset load condition.

20. The non-transitory computer-readable storage medium according to claim 17, wherein the writing the global data to a blockchain network comprises:

creating a new block;

writing the global data to the created new block; and adding, after the new block is verified by a blockchain network, the new block to the blockchain network.

\* \* \* \* \*